United States Patent
Littleford

(10) Patent No.: US 12,235,404 B2
(45) Date of Patent: Feb. 25, 2025

(54) MEASUREMENT METHOD AND APPARATUS

(71) Applicant: Welldata (Subsurface Surveillance Systems) Ltd., Fife (GB)

(72) Inventor: Sydney Joseph Littleford, Fife (GB)

(73) Assignee: Welldata (Subsurface Surveillance Systems) Ltd., Fife (GB)

( * ) Notice: Subject to any disclaimer, the term of this patent is extended or adjusted under 35 U.S.C. 154(b) by 179 days.

(21) Appl. No.: 17/642,181

(22) PCT Filed: Sep. 10, 2020

(86) PCT No.: PCT/EP2020/075410
§ 371 (c)(1),
(2) Date: Mar. 10, 2022

(87) PCT Pub. No.: WO2021/048319
PCT Pub. Date: Mar. 18, 2021

(65) Prior Publication Data
US 2022/0326407 A1 Oct. 13, 2022

(30) Foreign Application Priority Data

Sep. 12, 2019 (GB) .................................... 1913194
Jan. 20, 2020 (GB) .................................... 2000811

(51) Int. Cl.
*G01V 3/30* (2006.01)
*E21B 33/00* (2006.01)
(Continued)

(52) U.S. Cl.
CPC ................ *G01V 3/30* (2013.01); *E21B 33/00* (2013.01); *E21B 47/047* (2020.05); *G01V 3/38* (2013.01)

(58) Field of Classification Search
CPC ............... G01V 3/18; G01V 3/26; G01V 3/28
See application file for complete search history.

(56) References Cited

U.S. PATENT DOCUMENTS

| 7,453,265 B2 | 11/2008 | Johnstad et al. |
| 2011/0301850 A1 | 12/2011 | Maao |

(Continued)

FOREIGN PATENT DOCUMENTS

| GB | 2570957 A | 8/2019 |
| WO | 2012151488 A1 | 11/2012 |
| WO | 2014199179 A2 | 12/2014 |

OTHER PUBLICATIONS

"International Search Report and Written Opinion of the International Searching Authority", International Application No. PCT/EP2020/075410, Dec. 3, 2020, 13 pp.

*Primary Examiner* — Tung X Nguyen
(74) *Attorney, Agent, or Firm* — Myers Bigel, P.A.

(57) ABSTRACT

There is disclosed in one implementation a method of or for use in or for detecting, measuring and/or determining at least one variable or characteristic in a space, such as a well, container or vessel. In one implementation the method comprises: transmitting a first electromagnetic signal from a first position to a feature within the space; receiving a second electromagnetic signal at a second position after reflection of the transmitted first electromagnetic signal from the feature; transmitting a third electromagnetic signal from a third position to a calibration feature within the space; receiving a fourth electromagnetic signal at a fourth position after reflection of the transmitted third electromagnetic signal from the calibration feature. The method further comprises: subsequently transmitting a further first electromagnetic signal from the first portion to the feature; receiving a further second electromagnetic signal at the second position after reflection of the transmitted further first electromagnetic signal from the feature; transmitting a further third electromagnetic signal from the third position to the calibration feature; receiving a further fourth electromagnetic signal at the fourth position after reflection of the transmitted further (Continued)

third electromagnetic signal from the calibration feature. In so doing one can determining (the) at least one variable or characteristics from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

20 Claims, 27 Drawing Sheets

(51) Int. Cl.
  *E21B 47/047* (2012.01)
  *G01V 3/38* (2006.01)

(56) References Cited

U.S. PATENT DOCUMENTS

| | | | |
|---|---|---|---|
| 2013/0299165 A1* | 11/2013 | Crow | E21B 47/10 166/66 |
| 2014/0124210 A1 | 5/2014 | Dowell | |
| 2017/0010387 A1 | 1/2017 | Huang | |
| 2019/0235102 A1* | 8/2019 | Van de Kop | G01V 1/005 |

\* cited by examiner

FDR System $$F^{-1}[f](x) = \frac{1}{2\pi} \int_{-\infty}^{\infty} f(w)e^{-1\omega} \, dw$$

FLM in 18" Casing Examples

- Initial SIEP testing t01
- First reading taken using FDR
- C-Band Horn (TE11)
- 4-6 GHz
- 5001 points
- FLD 180m
- SIEP had incorrect FL
- 65 dB reflection

- Ka-Band Horn (TE11)
- 26-40 GHz
- 20001 points
- FLD 180m
- No visibility of connections
- Reflection strength unchanged
- Higher noise floor
- 40 dB reflection FLM in 9-5/8" Casing Examples

- C-Band Horn (TE11)
- 4-6 GHz
- 7101 points
- FLD 250m
- High visibility of connections. 40 dB reflection

- Ku-Band Horn (TE11)
- 12.4 - 18 GHz
- 20000 points
- FLD 250m
- Reduced connection reflections
- 45 dB reflection FLM in 7" Casing Examples

- 40 GHz TE01
- 34 - 40 GHz
- 16001 points
- FLD 220m
- Moderate definition of connections
- Reflector at -35dB

- K band TE11
- 34 - 40 GHz
- 16001 points
- FLD 220m
- Clearer definition of connections
- Reflector at -65dB, 30 dB below TE01

FLM in 3-1/2" Tubing Examples

- Errol Test run
- 40 GHz TE01
- 3-1/2" VAM Cr13 Tubing
- 34-40 GHz. 16001 points
- High definition tubing connections
- FLD 523 meters

- Errol Test run
- 40 GHz TE01
- 3-1/2" VAM Cr13 Tubing
- 60-70 GHz. 24001 points
- FLD 523 meters FLM in 2-3/8" Tubing Examples

- 40 GHz TE01
- MS46122a VNA
- 34-39 GHz
- 16001 points
- No clarity on connections
- FLD 94.7 meters

- 40 GHz TE01S820E
- 35 - 40 GHz
- 4001 points
- Clarity on connections
- FLD 84 meters

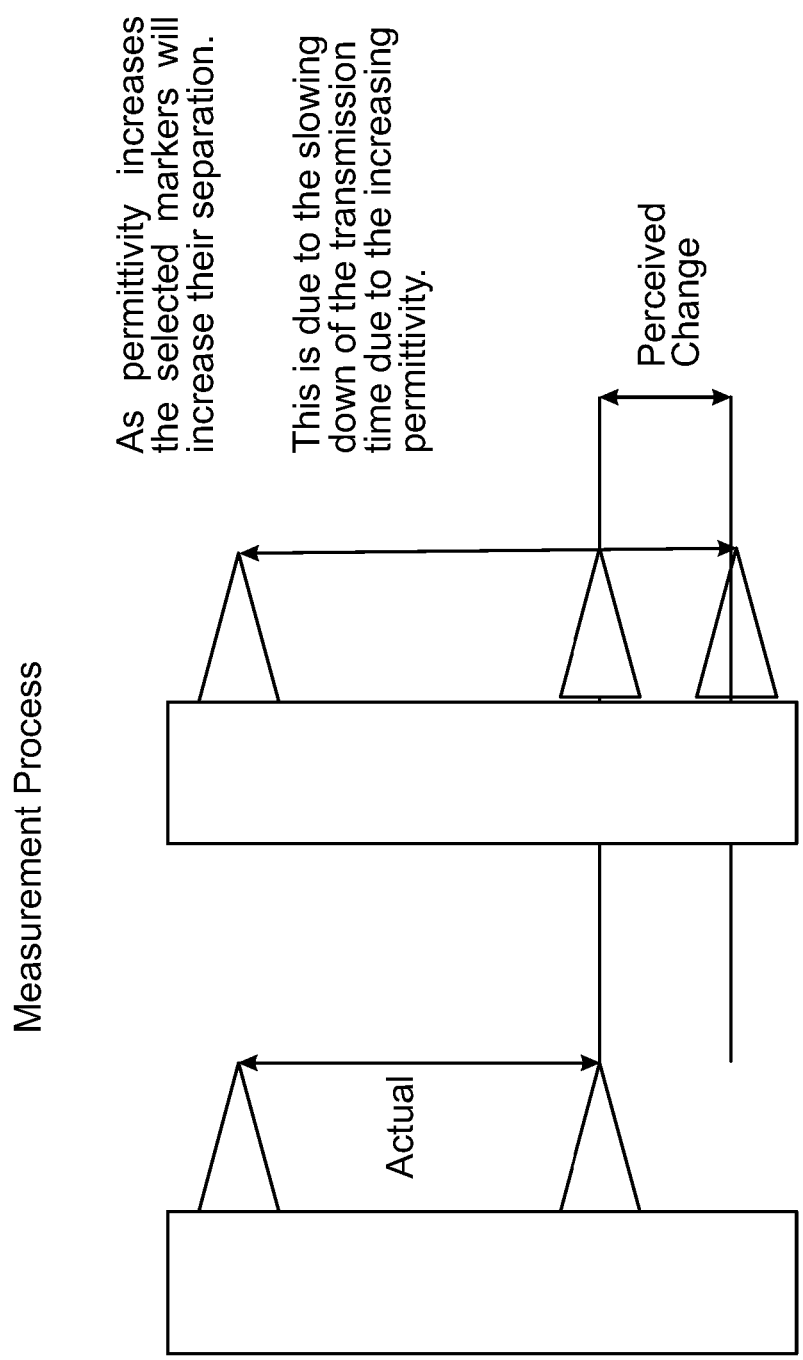

MEASUREMENT METHOD AND APPARATUS

RELATED APPLICATIONS

This application is a 35 U.S.C. § 371 national stage application of PCT Application No. PCT/EP2020/075410, filed on Sep. 10, 2020, which claims priority from British Application No. 1913194.5, filed on Sep. 12, 2019 and British Application No. 2000811.6, filed on Jan. 20, 2020, the contents of all of which are incorporated herein by reference in their entireties. The above-referenced PCT International Application was published as International Publication No. WO/2021/048319 A1 on Mar. 18, 2021.

FIELD OF INVENTION

The present invention relates to detection and/or measurement, e.g. detection and/or measurement within a well or within a container or vessel, e.g. a sealed (or unsealed) well, container or vessel. In particular, though not exclusively, the invention relates to a method, system, apparatus and/or device for detection and/or measurement or for detecting and/or measuring a feature or features or variable or variables or characteristic or characteristics, for example, downhole, for example, in an oil, gas and/or water well, for example, a subsea or offshore well. The method may, for example, find use in detecting one or more fluid interfaces, such as in a completed oil, gas or water well.

The present invention particularly, though not exclusively, relates to a method, apparatus and system for subsurface microwave detection and/or measurement which may utilise Frequency Domain Reflectometry (FDR) and other microwave measurement systems such as FMCW (Frequency Modulated Continuous Wave).

The present invention particularly, though not exclusively, relates to a method, apparatus and system that utilises the gas and/or fluid filled container or vessel as a measurement instrument that utilises the geometry, impedance, permittivity and/or temperature of such a vessel to provide measurement data such as inter alia distance, pressure, for example.

BACKGROUND TO INVENTION

It is often desirable to measure a level of one or more fluid interfaces within a completed oil, gas and/or water well. The term "completed" is typically understood in the art to refer to a well which has been drilled and which may be sealed and/or capable of production. For example, it is often desirable to measure the level of oil, water and/or gas in such wells. This may be important when controlling flow rates of hydrocarbon fluids through an oil, gas and/or water well from a hydrocarbon-bearing formation surrounding the oil, gas and/or water well and/or when seeking to maximise the efficiency of production of hydrocarbon fluids from the oil, gas and/or water well. In this regard, it may be important to discriminate between the level of an interface existing between a layer of water and a layer of oil and/or the level of an interface existing between a layer of oil and a layer of gas. This may be useful when seeking to at least partially reduce the production of water to surface or when seeking to control the amount of gas produced in an oil, gas and/or water well for enhanced production of oil. It may also be desirable to measure the level of a fluid within an injection well when injecting a fluid such as water or a gas through the injection well.

It is also known to use a downhole pump in an oil, gas or water well to provide so-called artificial lift for fluids such as hydrocarbon fluids or water to surface. If the fluid levels in the well are permitted to fall below the level of a downhole pump, the pump may become susceptible to wear or damage or may malfunction or burn out. Thus, it may be important to have accurate real-time measurements of fluid levels in an oil, gas or water well relative to a downhole pump.

WO 2012/151488 (CHEVRON U.S.A. INC.) discloses a first distance measurement method in which electromagnetic pulses are transmitted to a fluid interface in an oil, gas and/or water well, wherein the electromagnetic pulses have a frequency in the range of 3 MHz to 100 MHz. Distance information is determined from the round-trip travel time of the pulses from the transmitter to the fluid interface and back to the receiver. A second distance measurement method is disclosed in which a pair of different frequency tones are transmitted to a fluid interface in an oil, gas and/or water well and the distance to the fluid interface is determined from the phase difference between respective signals reflected from the fluid interface for each frequency tone. For distances of 500 m, such methods may only be used for signals of frequencies of the order of 300 kHz. Such methods may, however, provide limited fluid level measurement accuracy and/or resolution. In each distance measurement method, electromagnetic signals are transmitted along an electrically conductive coaxial path defined by an electrically conductive length of tubing located centrally within an electrically conductive length of casing to a fluid interface and the reflection of the electromagnetic pulses back along essentially the same coaxial path to a receiver. Such methods cannot be used in an uncased borehole or may provide unreliable or inaccurate fluid level measurements in the event of breaks in the conductivity of the casing. Such methods may provide unreliable or inaccurate fluid level measurements in the event that the tubing was to contact the casing or in the event that an electrically conductive object or obstruction were to bridge a gap between the tubing and the casing.

U.S. Pat. No. 7,453,265 (JOHNSTAD et al.) discloses the use of a Time Domain Reflectometry (TDR) method which relies upon the transmission of an electromagnetic signal having a frequency in the range of 1 kHz to 10 MHz for monitoring the position of an oil/water contact relative to a downhole toroidal transmitter transition elements (or antenna) located in a production zone within an annulus defined between the outside of a conductive tubing string and the inside of a casing pipe. Modelling results predict an attenuation of 40 dB for signal transmission down to 100 m where the oil-water contact occurs. Such a measurement method may have limited measurement sensitivity and/or limited measurement range. Such a method relies upon the use of signal conductors to convey a signal generated by a generator downhole through a packer to the downhole transmitter transition element (or antenna) and to convey a signal received by a receiver transition element (or antenna) through the packer up hole to a receiver and analyser arrangement. Signal conductors can be time-consuming and costly to install and/or manage.

WO2014/199179 A2 (WELLDATA (SUBSURFACE SURVELLIANCE SYSTEMS LTD) discloses a method for use in or for detecting a downhole feature in a well, the method comprising sealing the well and then:

transmitting an electromagnetic signal from a first position located substantially at or adjacent to surface through a first space to the downhole feature;

receiving an electromagnetic signal at a second position located substantially at or adjacent to surface after reflection of the transmitted electromagnetic signal from the downhole feature and after propagation of the reflected electromagnetic signal through a second space.

The present Inventors have developed a system that will measure Fluid Level Depths (FLD) in subsurface structures that include oil, gas and water wells.

The normal configuration of the wells includes metallic casing and tubing for the well construction and a service assembly of valves, normally called a wellhead.

A wellhead's function is to prevent well effluent from being 'produced' in an uncontrolled manner. The wellhead also prevents unsolicited entry into the well by foreign materials or objects.

In some instances an 'open hole' structure may occur during the construction of the well, but in normal circumstances the well is capped by a wellhead. In desirable embodiments, it is the wellhead-capped structure that the Inventors use for the FDR sensor application.

The FDR sensor is normally positioned at or built-in to the wellhead structure. In the application of the FLD measurement down the tubing the FDR sensor is positioned in a Christmas/Xmas Tree (XMT) sealing cap body and for annulus measurements a transition elements (or antenna)/transition is placed in the annulus below the tubing hanger.

With a wellhead in situ both the well's producing/injection conduits, the tubing and annulus, are isolated from the surface environment. The wellhead also allows the well conduits to be pressured and controlled using a series of valves. The pressure can be up to 20,000 psi and can also be a negative pressure (partial vacuum). Commonly, negative pressure can be encountered when the well is being used for injection or disposal purposes.

The isolation between atmospheric conditions existing outside the wellhead surface conditions and the well environment are, therefore, normally under stringent control via the wellhead valve arrangement and operator actions. Any communication through the XMT into the well can, therefore, only be accessed through the valve arrangement or bulkhead feedthroughs.

Normally feed-through penetrations such as control lines and I-wires are used for data paths to be constructed allowing the required data to be retrieved from in-well sensors such as downhole pressure and temperature sensors.

The FDR system developed by the present Inventors follow the configuration described above. A connection from the surface electronics to the transition elements (or antenna)/transition is achieved via a feed-through assembly either at the XMT cap or at the tubing hanger through an XMT feed-through arrangement.

Using FDR as a means of obtaining data (Fluid Level, Gas Liquid Ration Pressure and Water Cut) it is imperative that the wellhead structure has pressure control and integrity. This allows the well conditions to be optimised for the data sets to be retrieved.

The Inventors have sought to use a characteristic of the pressure effect on a gas, particularly changes to permittivity.

It is an object of at least one embodiment of at least one aspect of the present invention to obviate and/or at least mitigate one or more problems and/or disadvantages over the prior art.

It is an object of at least one embodiment of at least one aspect of the present invention to provide a method/system/approach/device for measuring/determining one or more variable/characteristics of or within a space, such as a well or container vessel. The variables/characteristics may comprise one or more of pressure, permeability and/or fluid/gas ratio.

SUMMARY OF INVENTION

According to the present invention there is provided a method, or an apparatus, or a well, container or vessel according to the appended claims.

According to a first aspect of the present invention there is provided a method of or for use in or for detecting, measuring and/or determining at least one variable or characteristic in a space, such as a well, container or vessel, the method comprising:

transmitting a first electromagnetic signal from a first position to a feature within the space;

receiving a second electromagnetic signal at a second position after reflection of the transmitted first electromagnetic signal from the feature;

transmitting a third electromagnetic signal from a third position to a calibration feature within the space;

receiving a fourth electromagnetic signal at a fourth position after reflection of the transmitted third electromagnetic signal from the calibration feature;

subsequently transmitting a further first electromagnetic signal from the first portion to the feature;

receiving a further second electromagnetic signal at the second position after reflection of the transmitted further first electromagnetic signal from the feature;

transmitting a further third electromagnetic signal from the third position to the calibration feature;

receiving a further fourth electromagnetic signal at the fourth position after reflection of the transmitted further third electromagnetic signal from the calibration feature;

determining (the) at least one variable or characteristic from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

The first, second, third and/or fourth positions may be within the space.

The first electromagnetic signal may be transmitted from the first position through at least a portion of the space to the feature.

The second electromagnetic signal may be received after propagation of the second electromagnetic signal through at least a portion of the space.

The third electromagnetic signal may be transmitted from the third position through at least a portion of the space to the calibration feature.

The fourth electromagnetic signal may be received after propagation of the fourth electromagnetic signal through at least a portion of the space.

The further first electromagnetic signal may be transmitted from the first position through at least a portion of the space to the feature.

The further second electromagnetic signal may be received after propagation of the second electromagnetic signal through at least a portion of the space.

The further third electromagnetic signal may be transmitted from the third position through at least a portion of the space to the calibration feature.

The further fourth electromagnetic signal may be received after propagation of the fourth electromagnetic signal through at least a portion of the space.

The variable or characteristic may be a downhole variable or characteristic.

The feature may be a fluid/fluid interface, e.g. liquid/gas interface.

The feature may be a downhole feature. The feature may be a liquid and/or a gas. The feature and/or the fluid, liquid and/or gas, may comprise or include solids and/or particulates, e.g. sand. In such instance, the method may be used to detect solids and/or particulates such as sand. The feature and/or fluid, liquid and/or gas may comprise a colloid, emulsion or suspension.

The method or technique may be implemented by using one or more downhole feature(s), e.g. as many as may be required in a space or downhole structure.

Having more than one calibration feature or point may provide a higher density of transmission data, e.g. to provide measurement criteria validation.

There may be provided one or more calibration feature(s). There may be provided one or more fourth electromagnetic signal(s). There may be provided one or more further fourth electromagnetic signal(s).

The calibration feature(s) may be at a known distance(s) from the first position and/or the second position.

The/ach calibration feature(s) may be a tubing or casing joint, e.g. a joint in or on a downhole tubular.

The space (well) may be unsealed during transmission of the first and/or third electromagnetic signals and/or receipt of the second and/or fourth electromagnetic signals.

The space (well) may be unsealed or sealed during transmission of the further first and/or further third electromagnetic signals and/or receipt of the further second and/or further fourth electromagnetic signals. The method may comprise sealing the space (well) after reception of the second and/or fourth electromagnetic signals and before transmission of the further first and/or further third electromagnetic signals.

The third electromagnetic signal may comprise or be one and the same as the first electromagnetic signal.

The further third electromagnetic signal may comprise or be one and the same as the further first electromagnetic signal.

The fourth electromagnetic signal may comprise or be one and the same as the second electromagnetic signal.

The further fourth electromagnetic signal may comprise or be one and the same as the further second electromagnetic signal.

The third position may comprise or be one and the same as the first position.

The fourth position may comprise or be one and the same as the second position.

The at least one variable or characteristic may comprise or include a permittivity or impedance of a material, e.g. fluid (gas/liquid) vapour, within the space/well.

The at least one variable or characteristic may comprise or include a ratio of fluid (F) to gas (G) (F/G ratio) within the space/well.

The at least one variable or characteristic may comprise or include a pressure (P) of a fluid/gas/liquid/vapour or liquid/gas mixture within the space/well.

The at least one variable or characteristic may comprise or include a temperature (T) of a fluid (F) or gas (G) within a/the well space.

The at least one variable or characteristic may define or include a fluid/gas interface, a fluid/gas ratio, gas permittivity, fluid/fluid contact interface, tubular connections and mechanical internal diameter anomalies and scale depositions such as calcium carbonate as well as other scale or other deposits.

One or more embodiments of the present invention may utilise at different times (e.g. $t_1$ to $t_2$) measuring a return time (e.g. $T_1$ or $T_2$, respectively) of one or more signals reflected from one or more fixed positions or features within a well, so as to determine a change in return time (e.g. $\Delta T = T_1 - T_2$), and thereby determine one or more variables and/or characteristics.

The variable and/or characteristics (within the well) may vary or change through various phases of a well, e.g. from completion to production.

The space may comprise a bore which may be provided within a (downhole) tubular or an annulus between first and second (downhole) tubulars.

The first position, second position, third position and/or fourth position may be located within or on a wellhead device, e.g. mounted at a head of a well or wellbore. The wellhead device may comprise a Christmas tree/Xmas tree/XMT, a Christmas tree cap, a Christmas tree body, a Christmas tree flange, a modified Christmas tree cap, a blind flange (which may replace a Christmas tree cap), and/or a mechanical system which provides an attachment/anchor location and/or pressure seal as a temporary or permanent replacement for any of the aforementioned.

The method may comprise:

transmitting an electromagnetic signal from a position (first position) located substantially at or adjacent to surface through a first/the space to the (downhole) feature;

receiving an electromagnetic signal at a further position (second position) located substantially at or adjacent to surface after reflection of the transmitted electromagnetic signal from the (downhole) feature and after propagation of the reflected electromagnetic signal through a second/the space.

The well may comprise an oil, gas and/or water well.

The well may be configured for production, injection, observation and/or disposal of a fluid such as oil, gas and/or water.

The well may be unsealed or sealed e.g. from atmosphere.

The method may comprise sealing the well before transmitting the electromagnetic signal, e.g. the further first, second, third and/or fourth electromagnetic signals.

The method may comprise installing completion infrastructure in the well and/or at a head of the well before transmitting the electromagnetic signal(s).

The method may comprise installing a valve or valve arrangement at a head of the well (or wellhead) before transmitting the electromagnetic signal(s).

The method may comprise installing a Christmas tree at a head of the well before transmitting the electromagnetic signal(s).

The method may comprise pressurising the well before transmitting the electromagnetic signal(s), e.g. the further first, second, third and/or fourth electromagnetic signals.

The method may comprise exposing the well to a fluid pressure existing within a sub-surface formation located adjacent to the well before transmitting the electromagnetic signal(s).

The method may comprise producing a fluid from the well before, during and/or after transmitting the electromagnetic signal(s).

The method may comprise injecting a fluid into the well before, during and/or after transmitting the electromagnetic signal(s).

A/the surface may define the mouth, opening or head of the well.

The surface may define the mouth, opening or head of a borehole of the well.

Surface level may comprise ground level or a level of the seabed.

One or each of the first, second, third and/or fourth positions may be located at or adjacent a head of the well.

One or each of the first, second, third and/or fourth positions may be located at, adjacent or within a wellhead.

One or each of the first, second, third and/or fourth positions may be located at, adjacent or within a device (or infrastructure) mounted at a head of the well.

One or each of the first, second, third and/or fourth positions may be located at, adjacent or within a Christmas tree.

The first space may extend from a position located substantially at or adjacent to surface to a position located substantially at or adjacent to the downhole feature.

The second space may extend from the position located substantially at or adjacent to the downhole feature to a position located substantially at or adjacent to surface.

The first space and the second space may be (one and) the same space.

The method may comprise determining a distance between the transmitter and the receiver from the transmitted and received electromagnetic signals.

The method may comprise determining a distance between surface and a/the downhole feature from the transmitted and received electromagnetic signals. For example, the method may comprise determining the distance between surface and the downhole feature as half of the distance between the transmitter and the receiver.

The method may comprise determining a rate of change of distance between surface and the downhole feature from the transmitted and received electromagnetic signals.

Such a method preferably does not rely upon the use of signal control wire or instruct wire (e.g. iwire) to convey signals from surface downhole and/or up hole to surface. Such a method preferably does not rely upon propagation along an electrically conductive coaxial path provided by downhole tubing and downhole casing. Rather the method may utilise propagation of (an) electromagnetic signal(s) within a bore of a first downhole tubular or within an annulus within or around a (first) downhole tubular or between first and second downhole tubulars.

Such a method may provide enhanced distance measurement sensitivity, range, accuracy and/or resolution relative to known fluid level measurement methods in oil, gas and/or water wells.

Such a method may permit the measurement of distance between surface and a downhole feature in a completed oil, gas and/or water well.

Such a method may permit the measurement of distance between surface and a downhole feature in a production, injection or observation well.

Such a method may permit the measurement of distance between surface and downhole feature in an oil, gas and/or water well during completion of the well.

Such a method may permit the measurement of distance between surface and a downhole feature in an oil, gas and/or water well before, during and/or after production of one or more fluids from the well.

Such a method may permit the measurement of distance between surface and a downhole feature in an oil, gas and/or water well before, during and/or after artificial lift of one or more fluids from the well.

Such a method may permit the measurement of distance between surface and a downhole feature in an oil, gas and/or water well during injection of one or more fluids into the well.

The oil, gas and/or water well may comprise steel, glass reinforced and/or composite tubulars or pipes. The composite tubulars or pipes may be or may comprise a composite of Glass Reinforced Epoxy (GRE) and steel. The first and/or second spaces may be enclosed and/or sealed tubular or annular volumes. The first and/or second spaces may be pressurised, e.g. at least during the subsequent steps. The first and/or second spaces may contain fluids and/or gases, e.g. at various temperatures and pressures. The temperature and pressure gradients within the first and/or second spaces may depend upon reservoir and fluid temperatures and pressures and/or other well dynamics.

The first and/or second spaces may be at least partially filled with one or more fluids. For example, the first and/or second spaces may be at least partially filled with at least one liquid and/or at least one gas. The first and/or second spaces may be at least partially filled with a mixture of liquids and/or a mixture of gases. The first and/or second spaces may be at least partially filled with a gas such as a hydrocarbon gas. The first and/or second spaces may be at least partially filled with a mixture of gases. For example, the first and/or second spaces may be at least partially filled with air. The first and/or second spaces may be at least partially filled with a mixture of hydrocarbon gases.

The first and/or second spaces may be at least partially filled with oil. The first and/or second spaces may be at least partially filled with water.

The step of determining the distance between surface and the downhole feature from the transmitted and received electromagnetic signals may require knowledge of a composition of a fluid or of each fluid present in the first and second spaces.

The step of determining the distance between surface and the downhole feature from the transmitted and received electromagnetic signals may require knowledge of a permittivity of a fluid or of each fluid present in the first and second spaces.

The well may comprise a borehole.

The well may be an open well or may preferably be a completed well. For example, the well may be sealed and/or may be capable of production and/or injection.

The well may comprise completion infrastructure in the well and/or at a head of the well. For example, the well may comprise a valve or valve arrangement for sealing the well. The valve or valve arrangement may be located at or adjacent to a head of the well or wellhead. The well may comprise a wellhead device or wellhead infrastructure mounted at a head of the well for sealing the well. The well/wellhead device may comprise a Christmas tree.

The well may comprise at least one downhole tubular.

(The) first and second spaces may be defined by, within and/or around the at least one downhole tubular.

The downhole tubular may be arranged around a periphery of the borehole.

The downhole tubular may comprise at least one of a casing, a liner or the like.

The downhole tubular may be separated from the borehole/borehole wall.

The downhole tubular and the borehole may define an annulus therebetween.

The downhole tubular may be located centrally within the borehole.

The downhole tubular may comprise a tubing string. The tubing string may be provided within and/or suspended within the well.

The downhole tubular may comprise at least one of production tubing, a work string, a drill string and the like.

At least one of the first and second spaces may be defined by the downhole tubular.

At least one of the first and second spaces may be defined internally of the downhole tubular, e.g. with a bore of the downhole tubular.

At least one of the first and second spaces may be defined externally of the down hole tubular.

At least one of the first and second spaces may be defined within an annulus defined between a downhole tubular located centrally within the borehole and a downhole tubular arranged around a periphery of the borehole.

The (downhole) feature may be spatially localised within the well.

The (downhole) feature may comprise a discontinuity.

The (downhole) feature may comprise an interface.

The (downhole) feature may comprise a fluid interface such as a gas-liquid interface, a gas-gas interface or a liquid-liquid interface. The method may comprise determining a distance between surface and the (fluid) interface from the transmitted and received electromagnetic signals.

The method may comprise determining a rate of change of distance between surface and the fluid interface from the transmitted and received electromagnetic signals.

The downhole feature may comprise an interface between a gas and a liquid.

The downhole feature may comprise an interface between two different types of liquid.

The downhole feature may comprise an interface between two different types of gas.

The method may comprise determining an amount of fluid in the well.

The method may comprise determining a rate of change of fluid level in the well.

The method may comprise:
transmitting an electromagnetic signal from surface to a fluid interface;
receiving an electromagnetic signal at surface after reflection of the transmitted electromagnetic signal from the fluid interface; and
determining a distance between surface and the fluid interface from the transmitted and received electromagnetic signals.

The downhole feature may comprise a gas-oil interface.

The method may comprise determining a distance between surface and a gas-oil interface from the transmitted and received electromagnetic signals.

The method may comprise determining a rate of change of distance between surface and the gas-oil interface from the transmitted and received electromagnetic signals.

The downhole feature may comprise an oil-water interface.

The method may comprise determining a distance between surface and an oil-water interface from the transmitted and received electromagnetic signals.

The method may comprise determining a rate of change of distance between surface and the oil-water interface from the transmitted and received electromagnetic signals.

The downhole feature may comprise an air, Nitrogen, $CO_2$, hydrocarbon gas interface.

The method may comprise determining a distance between surface and an air-hydrocarbon or other gas interface from the transmitted and received electromagnetic signals.

The method may comprise determining a rate of change of distance between surface and the air-hydrocarbon or other gas interface from the transmitted and received electromagnetic signals.

The method may comprise determining an amount of oil, gas and/or water in the well.

The method may comprise determining a rate of change of an oil, gas or water level in the well.

The method may comprise using a/the determined distance to the fluid interface to determine a degree and/or rate of thermal transfer between a fluid in a steam injection well and a fluid in a subterranean formation which surrounds the steam injection well. This may be important when trying to control a rate of production of a fluid such as a hydrocarbon fluid from a production well which is in fluid flow communication with the same subterranean formation which surrounds the steam injection well. Known Distributed Temperature Sensing (DTS) systems are either incapable of, or cannot readily or accurately determine a distance to a fluid interface in a well. In particular, known DTS systems are either incapable of, or cannot readily or accurately determine a distance to a fluid interface in a steam injection well.

The downhole feature may comprise a change in an inner diameter of a downhole tubular.

The downhole feature may comprise a change in a wall thickness of a downhole tubular.

The downhole feature may comprise a coupling between two downhole tubulars.

The downhole feature may comprise at least a part of a downhole tool.

The downhole feature may comprise at least a part of a downhole valve.

The downhole feature may comprise at least part of a downhole valve member.

The downhole feature may comprise a downhole object, obstruction, impairment, restriction, occlusion or the like.

The downhole feature may comprise at least one of particulates, sand, hydrates, wax, scale, corrosion and the like within the well.

The downhole feature may be deposited on a surface of a downhole tubular.

The downhole feature may be spatially distributed. The method may comprise exciting, launching or otherwise transmitting the electromagnetic signal as a TE mode.

The method may comprise exciting, launching or otherwise transmitting the electromagnetic signal as a TE11 or TE01 mode. Other modes, e.g. TE 11-TE (nn), may also be used to match well conditions and to assist with identification of artifacts within the well. It will be understood that the selection of a mode determines a particular electromagnetic field pattern of the radiation in the plane perpendicular (i.e., transverse) to the radiation's propagation direction. Transverse modes may occur in microwaves confined to a waveguide. The mode type may significantly influence the propagation distance and the reflected signal strength from artifacts withing the waveguide or tubing.

TE (nn) modes may occur due to the boundary conditions imposed on the wave by the waveguide/tubulars. For example, a microwave in a hollow metal waveguide/tubular will have zero tangential electric field amplitude at the walls of the waveguide, so the transverse pattern of the electric field of waves is restricted to those that fit between the walls. For this reason, the modes supported by a waveguide are quantized. The allowed modes can be found by solving Maxwell's equations for the boundary conditions of a given waveguide.

The modes can be induced by using a mode converter situated at the surface then transmitted into the well.

A TE01 mode may have lower propagation losses than other guided electromagnetic modes. Such a method may provide enhanced distance measurement sensitivity and/or enhanced distance measurement range compared with a method which uses a different guided electromagnetic mode.

The transmitted electromagnetic signal may have a frequency in a frequency range of 1 GHz to 100 GHz, 2 GHz to 50 GHz, 4 GHz to 40 GHz, or 20 GHz to 80 GHz. The use of such frequencies may provide enhanced distance measurement sensitivity, range, accuracy and/or resolution relative to known distance measurement methods.

Such frequencies may be propagated in a space defined by or around at least one of a standard tubular, pipe, casing, liner and like commonly used in the oil and gas industry.

The method may comprise transmitting the electromagnetic signal with a plurality of different frequencies.

The method may comprise transmitting the electromagnetic signal with a multitude of different frequencies.

The method may comprise transmitting the electromagnetic signal with at least 10 different frequencies, at least 100 different frequencies, at least 1,000 different frequencies, or at least 10,000 different frequencies.

The use of a multitude of different frequencies may provide enhanced distance measurement accuracy, resolution, sensitivity and/or range relative to known distance measurement methods.

The method may comprise transmitting the plurality of different frequencies sequentially.

The method may comprise altering the electromagnetic signals received for each of the different frequencies to correct or account for any differences in propagation speed of the different frequencies. The sequential transmission of the plurality of different frequencies may allow or facilitate such correction. Such correction may provide enhanced distance measurement accuracy, resolution, sensitivity and/or range relative to known distance measurement methods.

The method may comprise using a software algorithm to alter the electromagnetic signals received for each of the different frequencies to correct or account for any differences in propagation speed of and/or distance travelled by the different frequencies.

The method may comprise repeatedly sweeping the frequency of the transmitted electromagnetic signal through each of the plurality of different frequencies.

The method may comprise continuously sweeping the frequency of the transmitted electromagnetic signal through each of the plurality of different frequencies.

The method may comprise transmitting and/or receiving pulsed electromagnetic signals.

The method may comprise transmitting and/or receiving continuous wave electromagnetic signals.

The method may comprise transmitting one or more of the plurality of different frequencies simultaneously.

The method may comprise measuring a magnitude of the received electromagnetic signal as a function of frequency.

The method may comprise measuring a phase of the received electromagnetic signal as a function of frequency.

The method may comprise measuring a magnitude of the transmitted electromagnetic signal as a function of frequency.

The method may comprise measuring a phase of the transmitted electromagnetic signal as a function of frequency.

The method may comprise determining a magnitude frequency spectrum from the magnitude of the received electromagnetic signal and the magnitude of the transmitted electromagnetic signal as a function of frequency.

The method may comprise determining the magnitude frequency spectrum from a ratio of the magnitude of the received electromagnetic signal to the magnitude of the transmitted electromagnetic signal as a function of frequency.

The method may comprise using a Vector Network Analyser (VNA) or similar measuring device, such as a microwave reflectometer, to determine the magnitude frequency spectrum.

The method may comprise determining a phase frequency spectrum from the phase of the received electromagnetic signal and the phase of the transmitted electromagnetic signal as a function of frequency.

The method may comprise determining the phase frequency spectrum from a difference between the phase of the received electromagnetic signal and the phase of the transmitted electromagnetic signal as a function of frequency.

The method may comprise using a Vector Network Analyser (VNA) to determine the phase frequency spectrum.

The method may comprise determining a time domain reflectance trace from the magnitude frequency spectrum and the phase frequency spectrum.

Such a time domain reflectance trace may provide an indication of the time that would be taken by an electromagnetic pulse to travel from surface to the downhole feature and back to surface. Such a time domain reflectance trace is not, however, measured by transmitting electromagnetic pulses from surface to the downhole feature and back to surface.

The method may comprise using an inverse Fourier transform to determine a time domain reflectance trace from the magnitude frequency spectrum and the phase frequency spectrum.

The use of such a Frequency Domain Reflectometry (FDR) method may provide a time domain reflectance trace with less noise than other known distance measurement methods. This may provide enhanced distance measurement accuracy, resolution, sensitivity and/or range.

The method may comprise using a Vector Network Analyser (VNA) to determine the time domain reflectance trace.

The method may comprise using a Vector Reflectometer (VR) to determine the time domain reflectance trace.

The method may comprise determining the distance between surface and the downhole feature from the time domain reflectance trace.

The method may comprise determining the distance between surface and the downhole feature from a temporal delay associated with a reflectance feature in the time domain reflectance trace.

The method may comprise determining a nature of the downhole feature from a configuration of one or more reflectance features in the time and/or frequency domain reflectance trace.

The method may comprise determining a nature of the downhole feature from the size and/or shape of a reflectance profile or peak in the time and/or frequency domain reflectance trace, magnitude frequency spectrum and/or phase frequency spectrum.

The method may comprise determining a dielectric property of the (downhole) feature from a/the received or reflected electromagnetic signal. The dielectric property may be permittivity, dielectric constant or the like. For example, the dielectric property may be permittivity across a range of frequencies. Dielectric spectroscopy techniques may be applied to determine the dielectric property from the received electromagnetic signal. The dielectric spectroscopy techniques may utilise the time and/or frequency domains. The time domain reflectance trace, magnitude frequency spectrum and/or phase frequency spectrum may be used to determine the dielectric property. Time Domain Reflectometry (TDR) or Time Domain Spectroscopy (TDS) may be used to determine the dielectric property from the received electromagnetic signal.

The method may comprise determining a dielectric property of a material comprised within or present at the (downhole) feature. The method may comprise determining a dielectric property of a material present at an interface of the (downhole) feature, for example, at a gas-oil or water-oil interface. The received electromagnetic signal may comprise a reflected signal from the material. The profile, shape and/or amplitude of the reflected signal from the material may allow the determination of the dielectric property of that material. The method may comprise using dielectric spectroscopy in the time and/or frequency domain(s) to determine the dielectric property, for example, the method may comprise using TDR or TDS techniques. The method may allow fast and accurate identification of the composition of one or more materials comprised within or present at the downhole feature.

The method may comprise determining the distance between surface and the downhole feature from a frequency of the received electromagnetic signal.

The method may comprise determining the distance between surface and the downhole feature by comparing a frequency of the received electromagnetic signal to a frequency of the transmitted electromagnetic signal.

The method may comprise mixing at least a portion of a transmitted signal with at least a portion of a received signal to produce a beat signal.

The method may comprise mixing at least a portion of a/the transmitted electromagnetic signal with at least a portion of a/the received electromagnetic signal to produce a beat electromagnetic signal.

The method may comprise mixing at least a portion of an electrical signal transmitted to transition elements (or an antenna) to produce the transmitted electromagnetic signal with at least a portion of a received electrical signal produced on receipt of the received electromagnetic signal at an transition elements (or antenna) to produce a beat electrical signal.

The method may comprise demodulating the beat signal.

The method may comprise determining the distance between surface and the downhole feature from a magnitude of the demodulated beat signal.

Such a frequency-modulated continuous wave (FMCW) method may be simpler and, therefore, more cost effective to implement than a Frequency Domain Reflectometry (FDR) method.

The method may comprise repeatedly determining the distance between surface and the downhole feature.

The method may comprise continuously monitoring the distance between surface and the downhole feature.

Such a method may permit real-time or dynamic measurements of a level of a fluid interface. This may be useful for real-time control of fluid production or injection. This may be useful for real-time control of a downhole device such as a downhole pump.

The method may comprise controlling a downhole device according to a determined distance between surface and the downhole feature. For example, the method may comprise controlling a pump such as a gas-lift or Electric Submersible Pump (ESP) according to a determined distance between surface and the downhole feature.

The method may comprise disabling or powering down a downhole device according to a determined distance between surface and the downhole feature. For example, the method may comprise disabling or powering down a pump such as a gas-lift or Electric Submersible Pump (ESP) according to a determined distance between surface and the downhole feature.

The method may comprise using a determined distance between surface and a fluid interface to determine a pressure at the fluid interface.

The method may comprise using a known pressure at surface within the well, and a known specific gravity of any fluids located between surface and the fluid interface to determine the pressure at the fluid interface.

Such a method may provide a wireless, non-invasive solution for measuring downhole pressure.

The method may comprise using the determined pressure at the fluid interface to determine a rate of change of fluid pressure at the fluid interface. Such a method may provide an indication of a pressure change such as a pressure build-up.

The method may comprise using the determined distance between surface and a gas-oil interface to determine a pressure at the gas-oil interface.

The method may comprise using the determined distance between surface and an oil-water interface to determine a pressure at the oil-water interface.

The method may comprise using the determined distance between surface and a gas-water interface to determine a pressure at the gas-water interface.

Such a method may be combined with other measurement techniques such as acoustic measurement techniques to provide more information about the downhole feature and/or the downhole environment.

The method may comprise receiving an electromagnetic signal at surface after reflection of the transmitted electromagnetic signal from a plurality of downhole features within the well. For example, each of the downhole features may comprise a different downhole fluid interface.

The method may comprise determining a distance between surface and each of the downhole features.

The method may comprise determining a distance between surface and each of the downhole features from a time domain reflectance trace determined from a magnitude frequency spectrum and a phase frequency spectrum obtained from the transmitted and reflected electromagnetic signals.

The method may comprise determining a distance between surface and at least one of a gas-oil interface, an oil-water interface and a gas-water interface.

The method may comprise determining the thickness of a layer of oil in a/the well from the distance between surface and a gas-oil interface and the distance between surface and an oil-water interface.

The method may comprise using the determined distance between surface and the gas-oil interface and the determined distance between surface and the oil-water interface to determine a pressure at the oil-water interface.

The method may comprise using a known pressure at surface within the well, and a known specific gravity of the oil to determine a pressure or other variable or characteristic at the oil-water interface. Such a method may be useful for monitoring a downhole pressure in the well.

The method may comprise using the determined pressure at the oil-water interface to determine a rate of change of fluid pressure at the oil-water interface. Such a method may provide an indication of a pressure change such as a pressure build-up.

The method may comprise determining the dielectric properties of the surface reflecting the transmitted electromagnetic signals.

According to a second aspect of the present invention there is provided an apparatus for use in or for detecting, measuring and/or determining at least one downhole variable or characteristic in a space, such as a well, container or vessel, the apparatus comprising:
an arrangement for transmitting a first electromagnetic signal from a first position to a feature within the space;
an arrangement for receiving a second electromagnetic signal at a second position after reflection of the transmitted first electromagnetic signal from the feature;
an arrangement for transmitting a third electromagnetic signal from a/the third position to a calibration feature within the space;
an arrangement for receiving a fourth electromagnetic signal at a fourth position after reflection of the transmitted third electromagnetic signal from the calibration feature;
an arrangement for transmitting a further first electromagnetic signal from the first portion to the feature within the space;
an arrangement for receiving a further second electromagnetic signal at the second position after reflection of the transmitted further first electromagnetic signal from the feature within the space;
an arrangement for transmitting a further third electromagnetic signal from the third position to the calibration feature;
an arrangement for receiving a further fourth electromagnetic signal at the fourth position after reflection of the transmitted further third electromagnetic signal from the calibration feature;
an arrangement for determining the at least one variable or characteristics from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

The arrangements for transmitting the first electromagnetic signal, the third electromagnetic signal, the further first electromagnetic signal and the further third electromagnetic signal may comprise a (single) arrangement, transmitter transition element (or antenna) or transmitter.

The arrangements for receiving the second electromagnetic signal, the fourth electromagnetic signal, the further second electromagnetic signal and the further fourth electromagnetic signal may comprise a (single) arrangement, receiver transition element (or antenna) or receiver.

According to a third aspect of the present invention there is provided a well or a container or a vessel comprising an apparatus according to the second aspect of the present invention.

The well, container or vessel may be sealed or alternatively not sealed/unsealed. The well, container or vessel may be sealable and/or pressurisable/capable of being pressurised.

The well may comprise an oil, gas and/or water well or other effluent well.

The well may be configured for production, injection, observation and/or disposal of a feature such as oil, gas and/or water.

According to a fourth aspect of the present invention there is provided a method of or for use in or for detecting, measuring and/or determining at least one variable or characteristic in a space, such as a well, container or vessel, the method comprising (initially):
determining (a first parameter related to) a first physical distance between a (fixed) position and a feature within the space;
determining (a second parameter related to) a second physical distance between the position and a (fixed) calibration feature;
the method comprising (subsequently):
determining (a further first parameter related to) a first perceived or detected distance between the position and the feature;
determining (a further second parameter related to) a perceived or detected distance between the position and the calibration feature;
the method comprising (thereafter):
determining (the) at least one variable or characteristic from a (first) difference or variation between the first parameter and the further first parameter and a (second) between the second parameter and the further second parameter, for example, a (first) difference or variation between the first physical distance and the first perceived distance and a (second) difference or variation between the second physical distance and the second perceived distance.

Between the initial steps and subsequent steps, the method may comprise the step of sealing the space (well).

Between the initial steps and subsequent steps, the method may comprise the step of pressurising the space (well).

In a first implementation, the step of determining a first parameter related to a first physical distance between a (fixed) position and a feature within the space may comprise:
transmitting a first electromagnetic signal from a first (fixed) position to a feature within the space;
receiving a second electromagnetic signal at a second (fixed) position after reflection of the transmitted first electromagnetic signal from the feature.

In said first implementation, the step of determining a second parameter related to a second physical distance between the position and a (fixed) calibration feature
transmitting a third electromagnetic signal from a third position to a calibration feature within the space;
receiving a fourth electromagnetic signal at a fourth position after reflection of the transmitted third electromagnetic signal from the calibration feature.

In a second implementation, the step of determining a first parameter related to a first physical distance between a (fixed) position and a feature within the space comprises:

transmitting a first electromagnetic signal from a first (fixed) position to a feature within the space;

receiving a second electromagnetic signal at a second (fixed) position after reflection of the transmitted first electromagnetic signal from the feature.

In a second implementation, the step of determining a first parameter related to a first physical distance between a (fixed) position and a calibration feature within the space may comprise:

using or utilising a pipe tally or known number of tubing lengths or tubing joint lengths ("pipe tally") between the position and the calibration feature.

In any implementation, the (subsequent) step of determining a further first parameter related to a first perceived or detected distance between the position and the feature may comprise:

transmitting a first electromagnetic signal from the first portion to the feature;

receiving a further second electromagnetic signal at the second position after reflection of the transmitted further first electromagnetic signal from the feature.

In any implementation, the (subsequent) step of determining a further second parameter related to a second perceived or detected distance between the position and the calibration feature may comprise:

transmitting a further third electromagnetic signal from the third position to the calibration feature;

receiving a further fourth electromagnetic signal at the fourth position after reflection of the transmitted further third electromagnetic signal from the calibration feature.

In any implementation, the step of determining (the) at least one variable or characteristic from a (first) difference or variation between the first parameter and the further first parameter and a (second) between the second parameter and the further second parameter and/or determining (the) at least one variable or characteristic from a (first) difference or variation between the first physical distance and the first perceived distance and a (second) difference or variation between the second physical distance and the second perceived distance may comprise:

determining (the) at least one variable or characteristics from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

According to a fifth aspect of the present invention there is provided an apparatus for use in or for detecting, measuring and/or determining at least one downhole variable or characteristic in a space, such as a well, container or vessel, the apparatus comprising:

an arrangement or means for determining (a first parameter related to a) first physical distance between a (fixed) position and a feature within the space;

an arrangement or means for determining (a second parameter related to a) second physical distance between the position and a (fixed) calibration feature;

an arrangement or means for determining (a further first parameter related to a) first perceived or detected distance between the position and the feature;

an arrangement or means for determining a (further second parameter related to) a second perceived or detected distance between the position and the calibration feature;

an arrangement or means for determining (the) at least one variable or characteristic from a (first) difference or variation between the first parameter and the further first parameter and a (second) difference or variation between the second parameter and the further second parameter, such as a (first) difference or variation between the first physical distance and the first perceived distance and a (second) difference or variation between the second physical distance and the second perceived distance.

The apparatus may comprise a sealing arrangement for sealing the space (well).

The apparatus may comprise a pressurising arrangement for pressurising the space (well).

In a first implementation, the arrangement or means for determining a first parameter related to a first physical distance between a (fixed) position and a feature within the space may comprise:

an arrangement for transmitting a first electromagnetic signal from a first position to a feature within the space;

an arrangement for receiving a second electromagnetic signal at a second position after reflection of the transmitted first electromagnetic signal from the feature.

In said first arrangement, the arrangement or means for determining a second parameter related to a second physical distance between the position and a (fixed) calibration feature may comprise:

an arrangement for transmitting a third electromagnetic signal from a/the third position to a calibration feature within the space;

an arrangement for receiving a fourth electromagnetic signal at a fourth position after reflection of the transmitted third electromagnetic signal from the calibration feature.

In a second implementation, the arrangement or means for determining a further first parameter related to a first physical distance between a (fixed) position and a feature within the space may comprise:

an arrangement for transmitting a first electromagnetic signal from a first position to a feature within the space;

an arrangement for receiving a second electromagnetic signal at a second position after reflection of the transmitted first electromagnetic signal from the feature. In a second implementation the arrangement or means for determining a further second parameter related to a second physical distance between the position and a (fixed) calibration feature may comprise:

a memory or storage arrangement or means for storing a pipe tally or known number of tubing lengths or tubing joint lengths ("pipe tally") between the position and the calibration feature.

In any implementation, the arrangement or means for determining a further first parameter related to a first perceived or detected distance between the position and the feature may comprise:

an arrangement for transmitting a further first electromagnetic signal from the first portion to the feature within the space;

an arrangement for receiving a further second electromagnetic signal at the second position after reflection of the transmitted further first electromagnetic signal from the feature within the space.

In any implementation, the arrangement or means for determining a further second parameter related to a second perceived or detected distance between the position and the calibration feature may comprise:

an arrangement for transmitting a further third electromagnetic signal from the third position to the calibration feature;

an arrangement for receiving a further fourth electromagnetic signal at the fourth position after reflection of the transmitted further third electromagnetic signal from the calibration feature.

The number of electromagnetic signals sent and received may be adjusted and may consists of, e.g. 10,100,1000, 2000 or any combination of signals. (The signal amount is known as a bandwidth).

In any implementation, the arrangement or means for determining (the) at least one variable or characteristic from a (first) difference or variation between the first parameter and the further first parameter and a (second) difference or variation between the second parameter and the further second parameter and/or the arrangement or means for determining (the) at least one variable or characteristic from a (first) difference or variation between the first physical distance and the first perceived distance and a (second) difference or variation between the second physical distance and the second perceived distance may comprise:

an arrangement for determining the at least one variable or characteristics from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

The arrangements for transmitting the first electromagnetic signal, the third electromagnetic signal, the further first electromagnetic signal and the further third electromagnetic signal may comprise a (single) arrangement, transmitter transition element (or antenna) or transmitter.

The arrangements for receiving the second electromagnetic signal, the fourth electromagnetic signal, the further second electromagnetic signal and the further fourth electromagnetic signal may comprise a (single) arrangement, receiver transition element (or antenna) or receiver.

According to a sixth aspect of the present invention there is provided a well or a container or vessel comprising an apparatus according to the fifth aspect of the present invention.

The well, container or vessel may be sealed or alternatively not sealed/unsealed.

The well may comprise an oil, gas and/or water well or other effluent.

The well may be configured for production, injection, observation and/or disposal of a feature such as oil, gas and/or water.

It will be understood that one or more features disclosed in relation to one or more aspects of the present invention may apply alone or any combination in relation to any other aspect of the present invention.

BRIEF DESCRIPTION OF DRAWINGS

Embodiments of the present invention will now be described by way of example only, and with reference to the accompanying drawings, which are:

FIGS. 24(a) and (b) illustrations of actual and detected (perceived) spacing or separation between a feature and a calibration feature according to an embodiment of the present invention;

DETAILED DESCRIPTION OF DRAWINGS

Figure 1A:
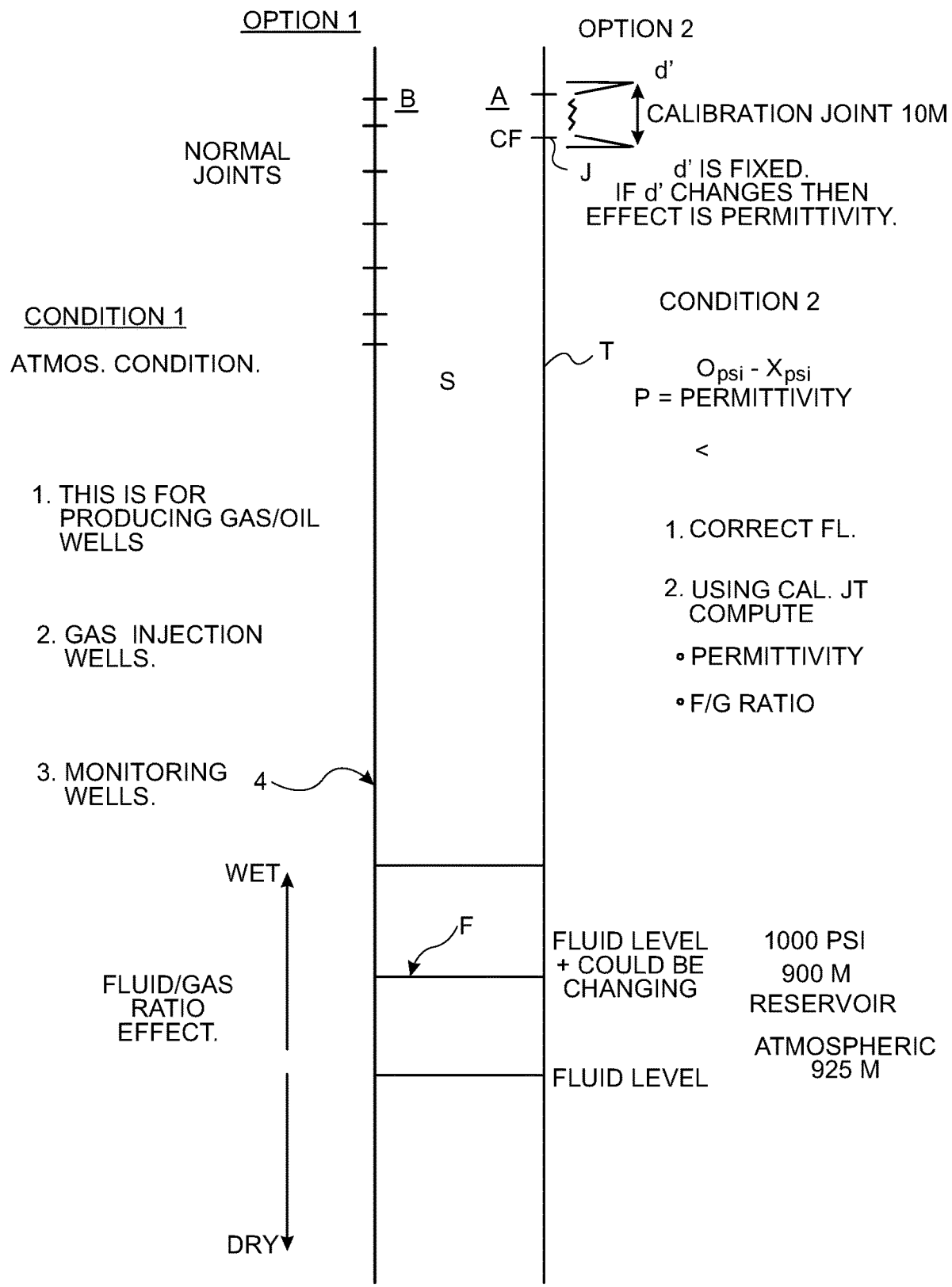
FIG. 1(a) a schematic view of an oil, gas or water well in an unsealed state and utilised in an embodiment of the present invention.

Referring to FIGS. 1(a) and (b) there is shown a well, e.g. an oil gas and/or water well, generally designated 4. In FIG. 1(a) the well 4 is shown in an unsealed or "open hole" state.

Figure 1B:
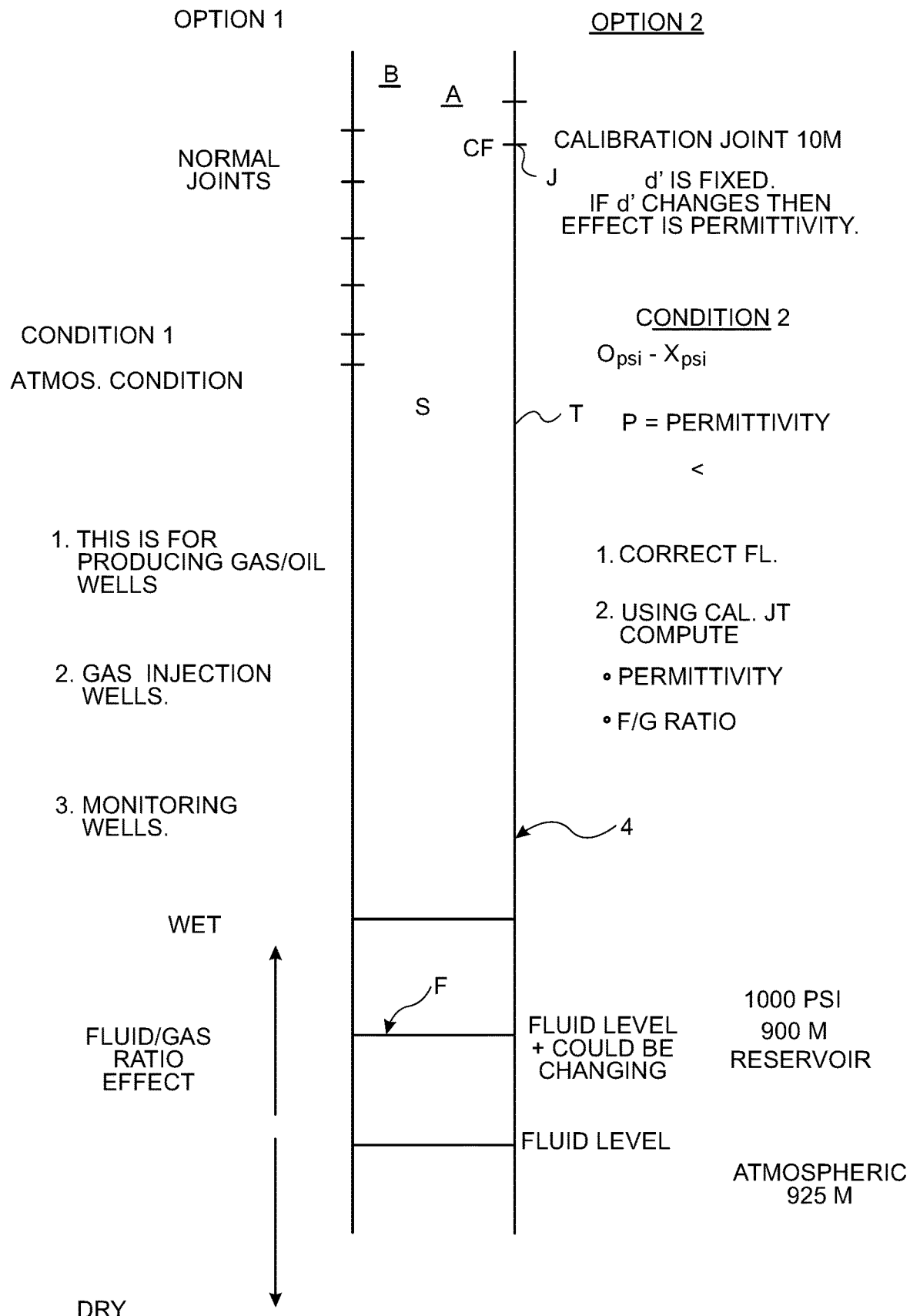
FIG. 1(b) a schematic view of the oil, gas or water well of FIG. 1(a) in a sealed state and utilised in an alternative or additional embodiment of the present invention.

In FIG. 1(b) the well 4 is shown in a sealed or "pressurised" state.

Figure 1C:
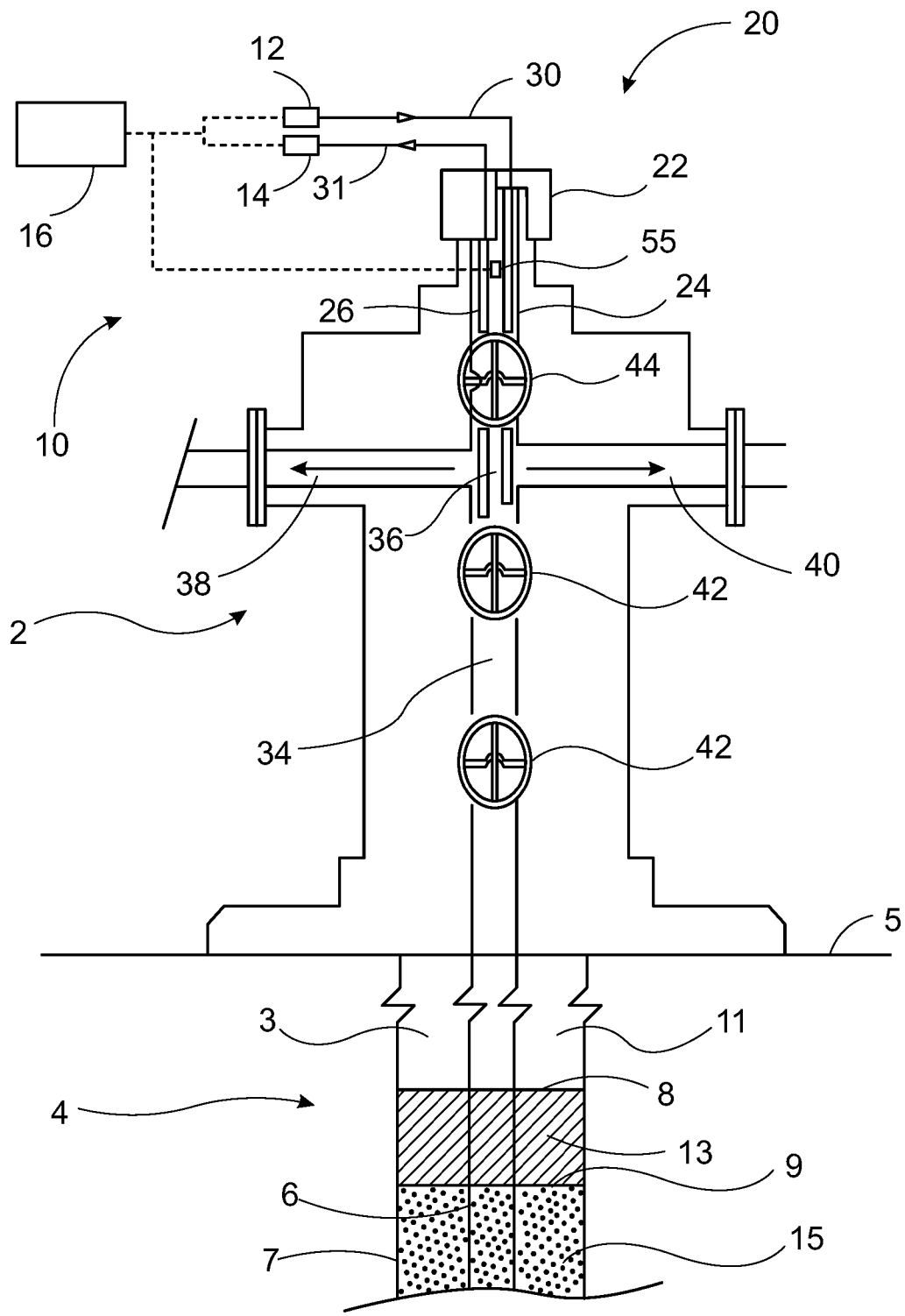
FIG. 1(c) a schematic view of a Christmas tree at the head of the oil, gas or water well of FIG. 1(a) or (b) comprising a first system for detecting a downhole feature in the oil, gas and/or water well.

Referring to FIG. 1(c), there is shown a Christmas tree, generally designated 2, located at the head of the well and which extends downwardly from surface 5. The Christmas tree 2 may be a subsea tree or a surface tree and, as such, surface 5 may represent the seabed or ground level, respectively. The well 4 includes production tubing 6 centrally located within a casing 7. An annulus 3 is defined between the production tubing 6 and the casing 7. A first feature in the form of a first fluid interface 8 is located downhole in the well 4 between a first fluid 11 and a second fluid 13. A second feature in the form of a second fluid interface 9 is located downhole in the well 4 between the second fluid 13 and a third fluid 15. As shown in FIG. 1(c), the second fluid interface 9 is located downhole in the well 4 below the first fluid interface 8. The first fluid 11 may be a gas such a hydrocarbon gas or a mixture of gases. The first fluid 11 may be air. The second fluid 13 may be oil. The third fluid 15 may be water. The first fluid interface 8 may be a gas-oil interface. The second fluid interface 9 may be an oil-water interface.

The Christmas tree 2 includes a system, generally designated 10, for detecting a downhole feature located downhole in the well 4, such as the first and second fluid interfaces 8, 9. The system 10 comprises a transmitter 12, a receiver 14 and a controller 16. As indicated by the dotted lines in FIG. 1, the controller 16 is configured for communication with the transmitter 12 and the receiver 14. The system 10 comprises a cap arrangement, which is generally designated 20 and which includes a cap member 22, and a transmitter transition element (or antenna) 24 and receiver transition element (or antenna) 26, extending downwardly from the cap member 22. The system 10 further comprises a first electrical conductor 30 which extends through the cap portion 22 and connects the transmitter 12 to the transmitter transition element (or antennae) 24, and a second electrical conductor 31 which extends through the cap member 22 and connects the receiver transition element (or antennae) 26 to the receiver 14.

Figure 2:
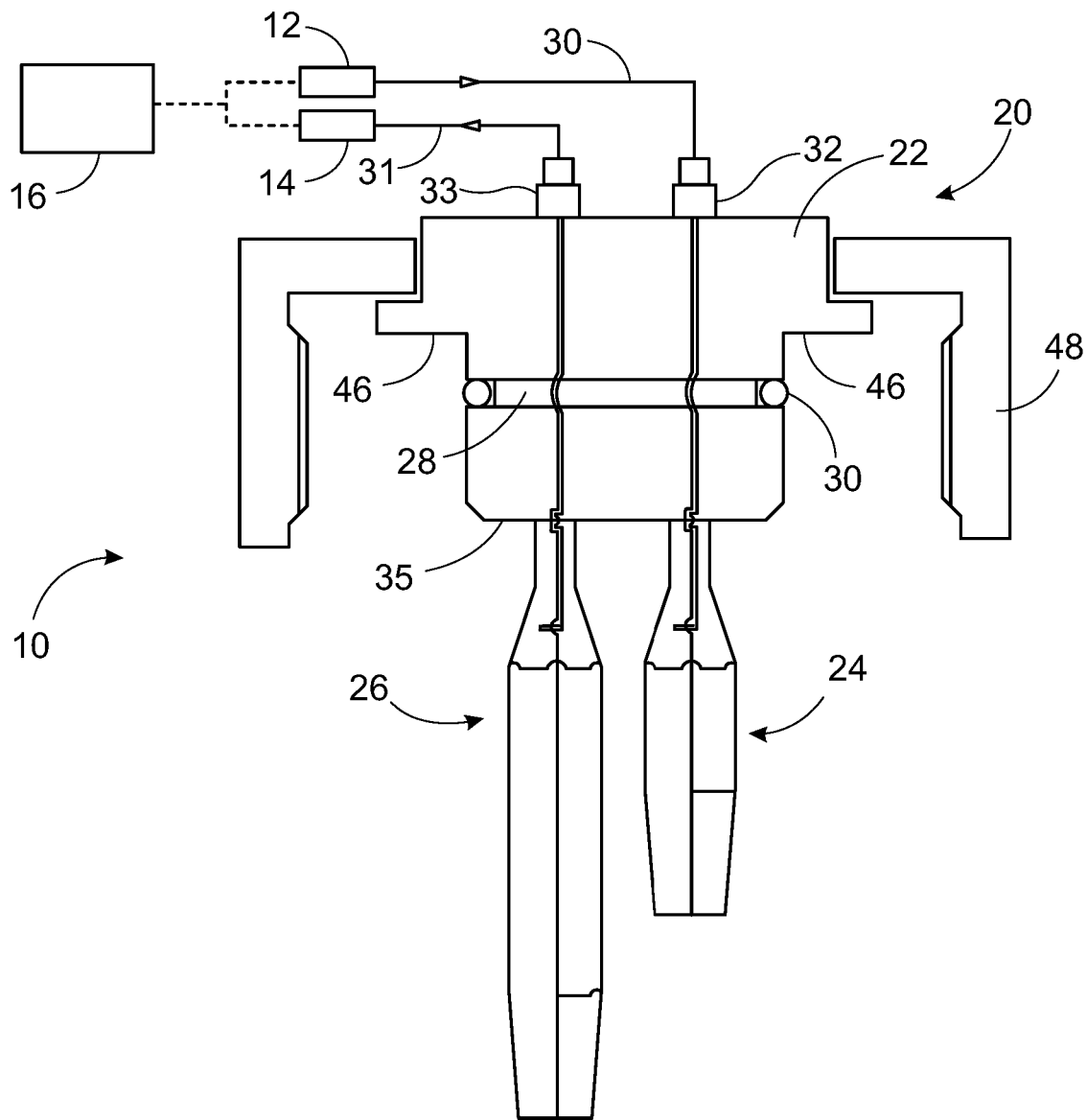
FIG. 2 a schematic view of the system of FIG. 1(a) in isolation from the Christmas tree.

The system 10 is shown in more detail in FIG. 2. The first and second electrical conductors 30, 31 are sealed relative to the cap member 22 via cable glands 32, 33. The cap member 22 defines an annular groove 28 in an outer diameter thereof. The cap member 22 further includes an O-ring 30 which is accommodated in the annular groove 28.

The transmitter and receiver transition elements (or antennae) 24, 26 are modified horn transition elements (or antennae) which extend downwardly from a lower surface 35 of the cap member 22 into a through bore 34 of the Christmas tree 2. As shown most clearly in FIG. 2, the receiver transition element (or antenna) 26, extends downwardly into through-bore 34 further than the transmitter transition element (or antenna) 24. This may serve to ensure that a return electromagnetic signal propagating upwardly through the through-bore 34 encounters and is received by the receiver transition element (or antenna) 26 before the return electromagnetic signal is incident upon the transmitter transition element (or antenna) 24. This may serve to reduce or suppress noise on the received signal caused by any distortion or spurious reflections of the return electromagnetic signal that may otherwise occur from the transmitter transition element (or antenna) 24.

With reference to FIG. 1(c), once the cap arrangement 20 is fitted to the Christmas tree 2, each of the transmitter and receiver transition elements (or antennae) 24, 26 extend downwardly past a junction 36 between the through-bore 34 and flow and kill paths 38 and 40, respectively, which extend laterally from the through bore 34.

To fit the cap arrangement 20 to the Christmas tree 2, one or both of the valves 42 are first closed so as to isolate a portion of the through-bore 34 above the valves 42 from well pressure. Subsequently, the valve 44 is opened and the transmitter and receiver transition elements (or antennae) 24, 26 are inserted into the through-bore 34 of the Christmas tree 2 past the valve 44 to a depth below the flow and kill paths 38, 40 until the O-ring 30 engages the through-bore 34 and forms a seal therewith and a shoulder or flange 46 of the cap member 22 shown in FIG. 2 engages an upper surface (not shown) of the Christmas tree 2. A locking member 48 shown in FIG. 2 is screw coupled to the Christmas tree 2 to lock the cap member 22 in place relative to the Christmas tree 2.

In use, the transmitter 12 transmits a radio frequency electrical signal to the transmitter transition element (or antenna) 24. The frequency of the electrical signal is varied sequentially in the range 4 to 80 GHz. Typically, the transmitter 12 can sequentially transmits 10,000 or more different radio frequencies in the range 4 to 80 GHz to the transmitter transition element (or antenna) 24. The transmitter transition element (or antenna) 24 couples the transmitted electrical signal to a guided TE-01 mode in the through bore 34. The TE-01 mode propagates through a space defined within the production tubing 6 to the first and second fluid interfaces 8, 9. At least a portion of the electromagnetic signal incident upon the first and second fluid interfaces 8, 9 is reflected from the first and second fluid interfaces 8, 9 and propagates as a guided TE-01 mode back up through the space defined within the production tubing 7 and the through bore 34 to the receiver transition elements (or antenna) 26. The receiver transition elements (or antenna) 26 couples the return electromagnetic signal to a return electrical signal which propagates along the second electrical conductor 31 to the receiver 14.

The controller 16 determines the magnitudes and phases of both the transmitted and received electrical signals as a function of frequency and determines a magnitude frequency spectrum and a phase frequency spectrum from the measured magnitudes and phases of both the transmitted and received electrical signals. The controller 16 uses an inverse Fourier transform to determine a reflectance time domain trace from the magnitude frequency spectrum and the phase frequency spectrum. From knowledge of the permittivities of any fluids present in the production tubing 6 at the appropriate frequencies, the controller 16 determines a reflectance trace as a function of depth.

The system 10 may be used to monitor downhole pressure in the well 4. The system 10 comprises a pressure sensor 55 located within the through-bore 34 for measuring pressure within the through-bore 34. The pressure sensor 55 is configured for communication with the controller 16. Having determined the distance between the surface 5 and the gas-oil interface 8 and the distance between the surface 5 and the oil-water interface 9, the controller 16 may use the pressure sensed by the pressure sensor 55 together with a known specific gravity of the gas 11 and the oil 13 to determine a pressure at the oil-water interface 9. Such a method may be useful for controlling production from the well 4 and/or injection into the well 4. Such a method may provide a wireless, non-invasive solution for measuring downhole pressure in the well 4.

Figure 3:
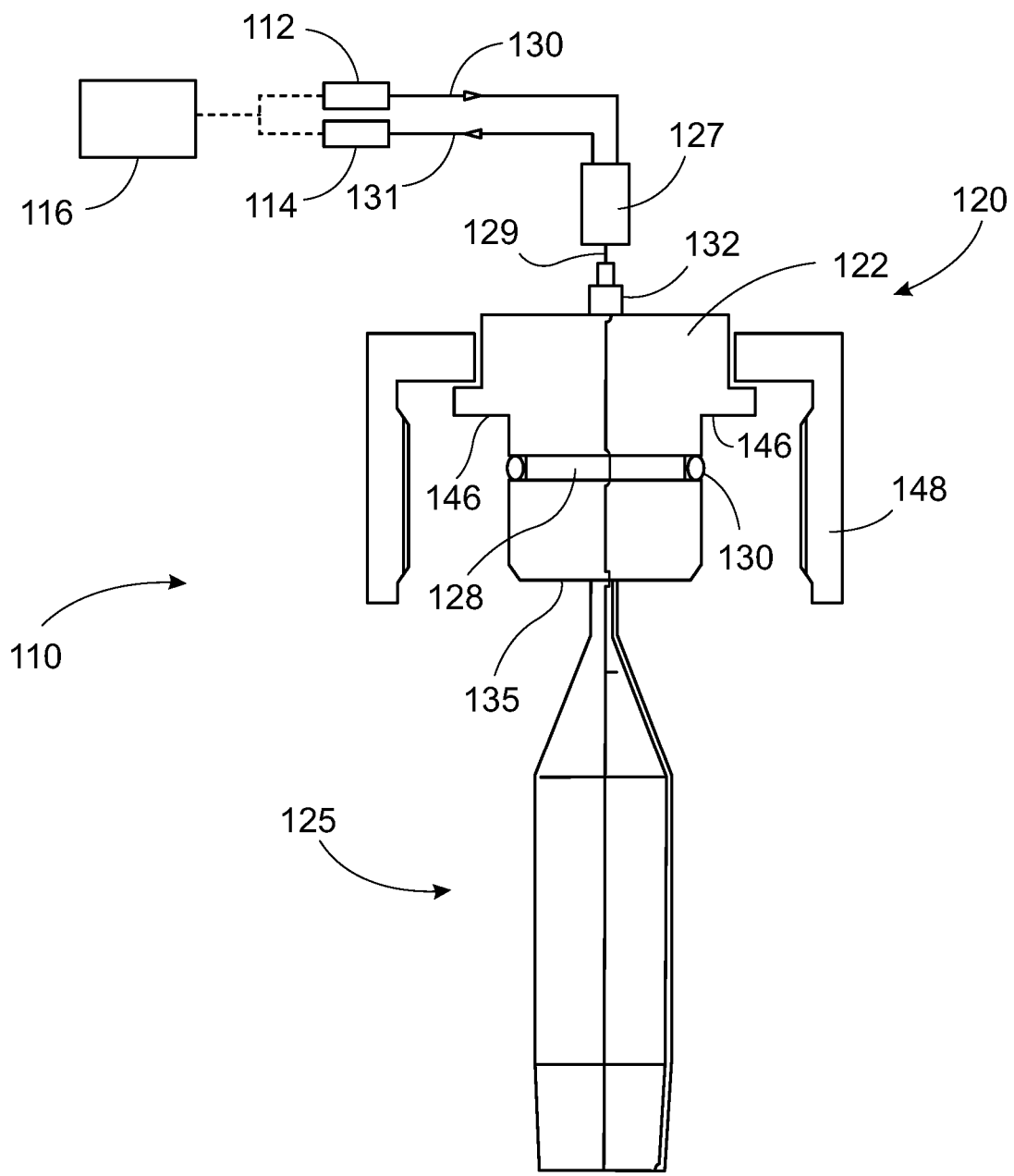
FIG. 3 a second system for detecting a downhole feature in isolation from a Christmas tree.

FIG. 3 shows a second system 110 for detecting a downhole feature in isolation from a Christmas tree. The second system 110 shares many like features with the system 10 of FIGS. 1 and 2 and, as such, like reference numerals are used to identify like features, but iterated by '100'. The system 110 comprises a transmitter 112, a receiver 114 and a controller 116. As indicated by the dotted lines in FIG. 5, the controller 116 is configured for communication with the transmitter 112 and the receiver 114.

The system 110 comprises a cap arrangement, which is generally designated 120, and which includes a cap member 122. The cap member 122 defines an annular groove 128 in an outer diameter thereof. The cap member 122 further includes an O-ring 130 which is accommodated in the annular groove 128. Unlike the system 10 of FIG. 2, the system 110 of FIG. 3 includes a (single) transition element(s) (or antenna) 125 which extends downwardly from the cap member 122 and which is used for transmitting and receiving electromagnetic signals.

The system 110 further comprises a coupler device 127. The coupler device 127 is connected to the transmitter 112 by a first electrical conductor 130, to the receiver 114 by a second electrical conductor 131 and to the transition element(s) (or antenna) 125 by a third electrical conductor 129. In use, electrical signals propagate along the third electrical conductor 129 in both directions between the coupler device 127 and the transition element(s) (or antenna) 125. The third electrical conductor 129 extends through the cap member 122 and is sealed relative to the cap member 122 via a cable gland 132.

The transition element(s) (or antenna) 125 is modified horn transition elements (or antenna) which extends downwardly from a lower surface 135 of the cap member 122 and which is configured to extend centrally into a through bore of a Christmas tree (not shown in FIG. 3). The use of such a transition element(s) (or antenna) 125 may provide improved coupling between electrical signals propagating along the third electrical conductor 129 and electromagnetic signals propagating along the through bore of the Christmas tree (not shown in FIG. 3).

Figure 4:
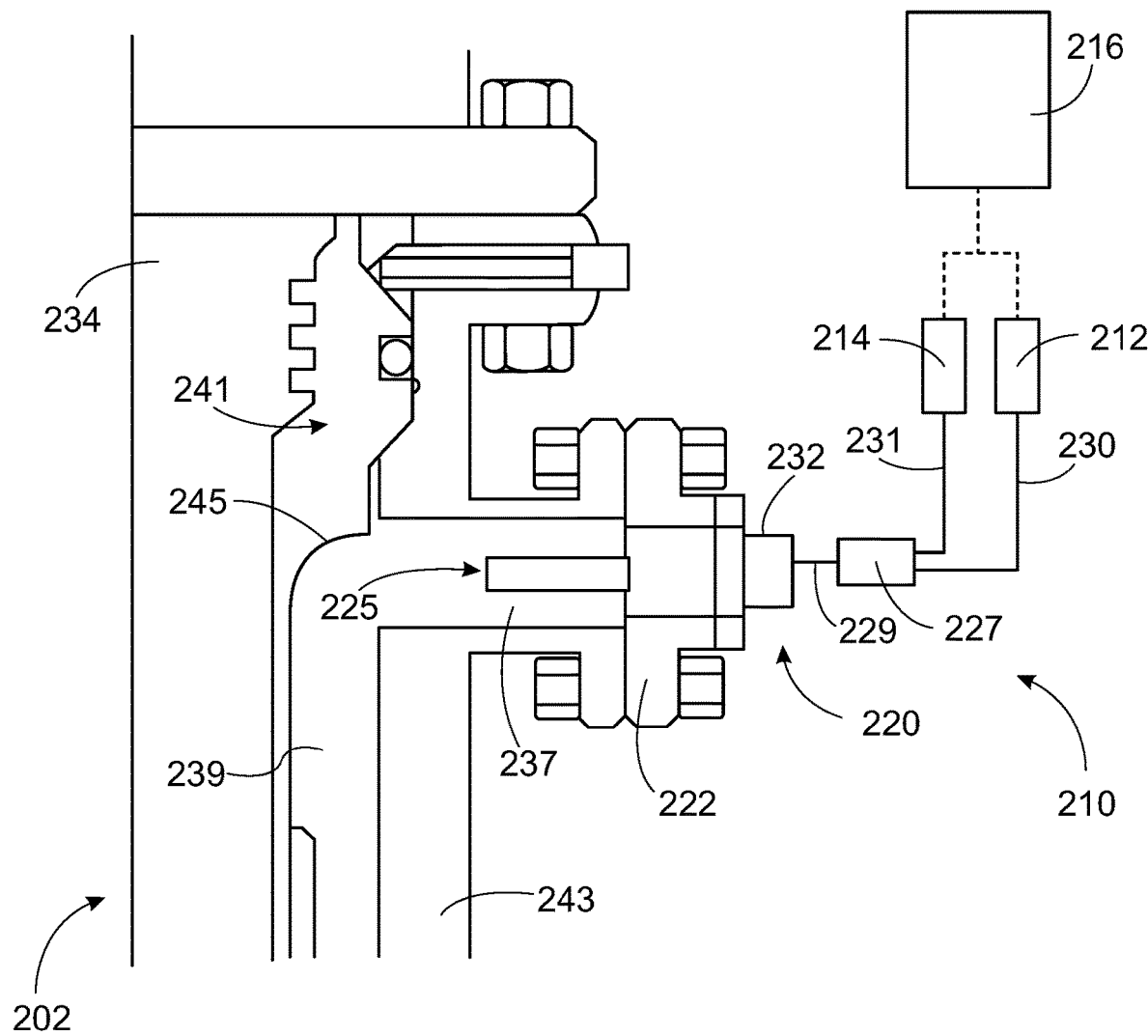
FIG. 4 a schematic cross-sectional view of part of a Christmas tree at a wellhead of an oil, gas and/or water well comprising a third system for detecting a downhole feature in the oil, gas and/or water well.

FIG. 4 is a schematic cross-sectional view of part of a Christmas tree 202 including a third system 210 for detecting a downhole feature in an oil, gas and/or water well (not shown in FIG. 4). The third system 210 shares many like features with the system 110 of FIG. 3 and, as such, like reference numerals are used to identify like features, but iterated by '100'. The system 210 comprises a transmitter 212, a receiver 214 and a controller 216. As indicated by the dotted lines in FIG. 4, the controller 216 is configured for communication with the transmitter 212 and the receiver 214. The system 210 includes a single transition element(s) (or antenna) 225 for transmitting and receiving electromagnetic signals.

The system 210 comprises a cap arrangement, which is generally designated 220 and which includes a cap member 222. Unlike the cap arrangement 120 of FIG. 3, the cap arrangement 220 is not configured to fit within a main through bore 234 of the Christmas tree 202 but is configured to fit within a lateral port or path 237 of the Christmas tree 202. The side port 237 provides access to an annulus 239 defined within the Christmas tree 202 between a tubing hanger 241 and an outer housing 243 of the Christmas tree 202. When the Christmas tree 202 is mounted at the head of an oil, gas and/or water well, such as the oil, gas and/or water well 4 shown in FIG. 1, the annulus 239 defined within the Christmas tree 202 is aligned with the annulus 3 of the well 4 so as to permit fluid flow communication therebetween.

The system 210 further comprises a coupler device 227. The coupler device 227 is connected to the transmitter 212 by a first electrical conductor 230, to the receiver 214 by a second electrical conductor 231 and to the transition element(s) (or antenna) 225 by a third electrical conductor 229. In use, electrical signals propagate along the third electrical conductor 229 in both directions between the coupler device 227 and the transition element(s) (or antenna) 225. The third electrical conductor 229 extends through the cap member 222 and is sealed relative to the cap member 222 via a cable gland 232.

Unlike the transition element(s) (or antenna) 225 of the system 110 of FIG. 3, the transition element(s) (or antenna) 225 extends laterally within the lateral path 237. In use, the transition elements (or antenna) 125 transmits an electromagnetic signal in a lateral direction along the lateral path 237. The transmitted electromagnetic signal is deflected through 90 degrees by a curved portion 245 of an outer surface of the tubing hanger 241 so as to propagate downwardly through the annulus 239 defined within the Christmas tree 202 towards the annulus 3 of the oil and gas well 4 shown in FIG. 1. Similarly, a return electromagnetic signal propagating upwardly within the annulus 239 is first deflected by the curve portion 245 of the tubing hanger 241 before being received by the transition elements (or antenna) 225.

Figure 5:
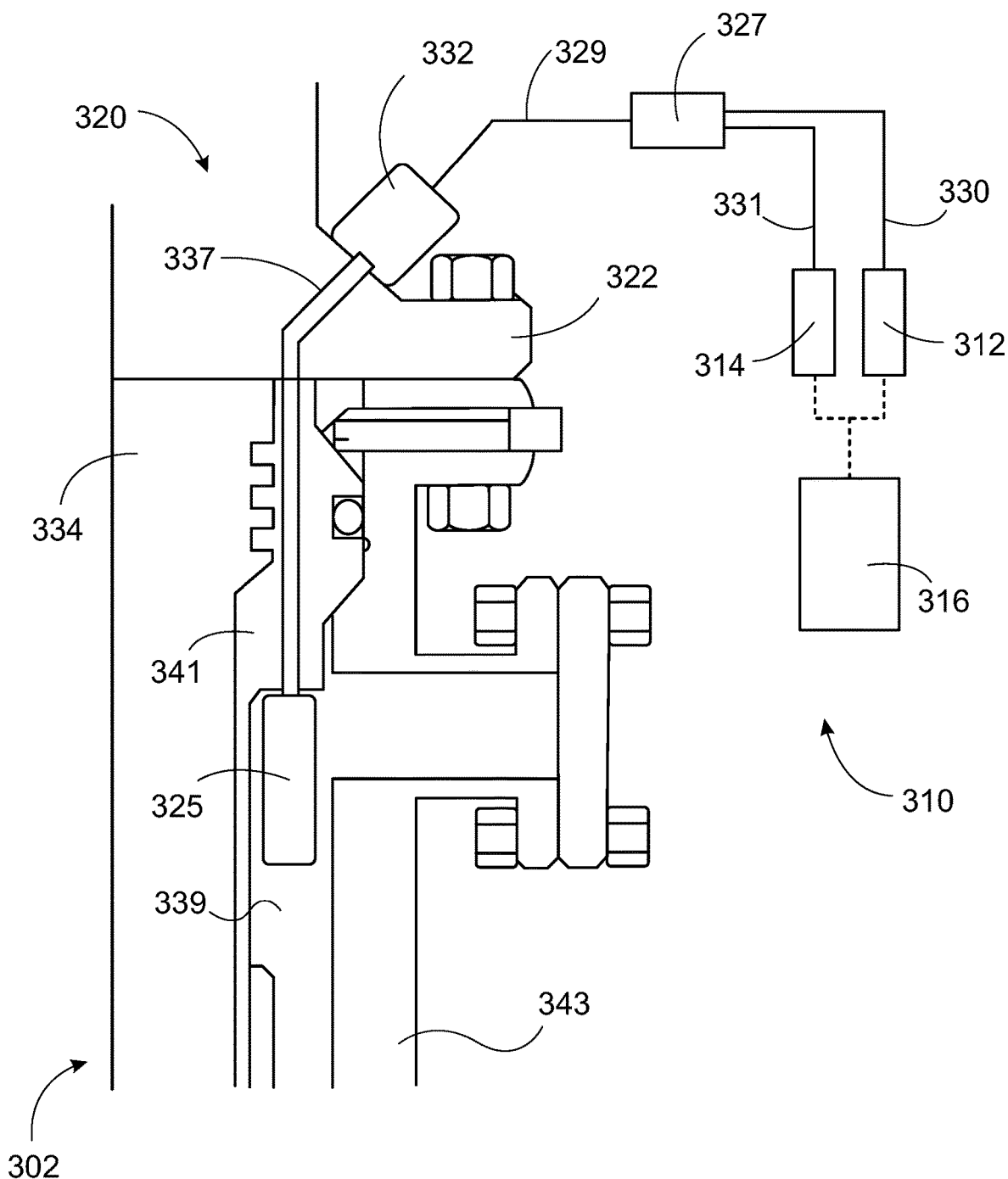
FIG. 5 a schematic cross-sectional view of part of a Christmas tree at a wellhead of an oil, gas and/or water well comprising a fourth system for detecting a downhole feature in the oil, gas and/or water well.

FIG. 5 is a schematic cross-sectional view of part of a Christmas tree 302 including a fourth system 310 for detecting a downhole feature in an oil, gas and/or water well (not shown in FIG. 5). The fourth system 310 shares many like features with the system 210 of FIG. 4 and, as such, like reference numerals are used to identify like features but iterated by '100'. The system 310 comprises a transmitter 312, a receiver 314 and a controller 316. As indicated by the dotted lines in FIG. 5, the controller 316 is configured for communication with the transmitter 312 and the receiver 314.

The system 310 comprises a cap arrangement, which is generally designated 320, and which includes a cap member 322. The system 310 includes a (single) transition element(s) (or antenna) 325 for transmitting and receiving electromagnetic signals. Unlike the cap arrangement 220 of FIG. 4, the cap arrangement 320 is configured to fit within a feed-through port or path 337 of the Christmas tree 302 which is angled at approximately 45° relative to a through bore 334 of the Christmas tree 302. The feed-through port 337 provides access to an annulus 339 defined within the Christmas tree 302 between a tubing hanger 341 and an outer housing 343 of the Christmas tree 302. When the Christmas tree 302 is mounted at the head of an oil, gas and/or water well, such as the oil, gas and/or water well 4 shown in FIG. 1, the annulus 339 defined within the Christmas tree 302 is aligned with the annulus 3 of the well 4 so as to permit fluid flow communication therebetween.

The system 310 further comprises a coupler device 327. The coupler device 327 is connected to the transmitter 312 by a first electrical conductor 330, to the receiver 314 by a second electrical conductor 331 and to the transition elements (or antenna) 325 by a third electrical conductor 329. In use, electrical signals propagate along the third electrical conductor 329 in both directions between the coupler device 327 and the transition element(s) (or antenna) 325. The third electrical conductor 329 is sealed relative to the cap member 322 via a cable gland 332.

Unlike the transition elements (or antenna) 225 of the system 210 of FIG. 4, the transition element(s) (or antenna) 325 extends along the feed-through path 337 at an angle of approximately 45° relative to the main bore 334. In use, the transition elements (or antenna) 325 transmits an electromagnetic signal downwardly directly into the annulus 339 defined within the Christmas tree 302 towards the annulus 3 of the oil and gas well 4 shown in FIG. 1. Similarly, a return electromagnetic signal propagating upwardly within the annulus 339 is received directly by the transition element(s) (or antenna) 325. The direct downward transmission and reception of electromagnetic signals between the transition element(s) (or antenna) 325 and the annulus 339 may reduce losses and/or noise on an electrical signal received at the receiver 314 compared with the losses and/or noise on an electrical signal received at the receiver 214 of the system 210 of FIG. 4 which relies upon reflection of transmitted and received electromagnetic signals through 90° from a deflector 245.

From the foregoing it will be appreciated that an embodiment of the present invention provides a method of or for use in or for detecting, measuring and/or determining at least one variable or characteristic in a space S, such as a well 4, container or vessel, the method comprising:

transmitting a first electromagnetic signal from a first position A to a feature F within the space;

receiving a second electromagnetic signal at a second position B after reflection of the transmitted first electromagnetic signal from the feature F;

transmitting a third electromagnetic signal from a third position A to a calibration feature CF within the space S;

receiving a fourth electromagnetic signal at a fourth position B after reflection of the transmitted third electromagnetic signal from the calibration feature CF;

subsequently transmitting a further first electromagnetic signal from the first portion A to the feature;

receiving a further second electromagnetic signal at the second position B after reflection of the transmitted further first electromagnetic signal from the feature F;

transmitting a further third electromagnetic signal from the third position A to the calibration feature;

receiving a further fourth electromagnetic signal at the fourth position B after reflection of the transmitted further third electromagnetic signal from the calibration feature CF;

determining the at least one variable or characteristics from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

The first, second, third and/or fourth positions are provided within the space S.

The first electromagnetic signal B transmitted from the first position A through at least a portion of the space S to the feature F.

The second electromagnetic signal is received after propagation of the second electromagnetic signal through at least a portion of the space S.

The third electromagnetic signal is transmitted from the third position A through a portion of the space S to the calibration feature CF.

The fourth electromagnetic signal B received after propagation of the fourth electromagnetic signal through at least a portion of the space S.

The further first electromagnetic signal is transmitted from the first A position through at least a portion of the space S to the feature F.

The further second electromagnetic signal is received after propagation of the second electromagnetic signal through at least a portion of the space S.

The further third electromagnetic signal is transmitted from the third position A through at least a portion of the space S to the calibration feature CF.

The further fourth electromagnetic signal is received after propagation of the fourth electromagnetic signal through at least a portion of the space S.

The variable or characteristic can be a downhole variable or characteristic.

The feature can be a fluid/fluid interface, e.g. liquid/gas interface.

The feature can be a downhole feature.

The feature can be a fluid, liquid and/or a gas. The feature and/or the fluid, liquid and/or gas can comprise or include solids and/or particulates, e.g. sand. In such instance, the method can be used to detect solids and/or particulates such as sand. The feature and/or liquid and/or gas may comprise a colloid, emulsion or suspension.

The calibration feature can be at a known distance from the first position A and/or the second position B.

The calibration feature CF in this embodiment a joint J in or on a downhole tubular T.

The space S (well) can be unsealed (FIG. 1(a) or sealed (FIG. 1(b)) during transmission of the first and/or third electromagnetic signals and/or receipt of the second and/or fourth electromagnetic signals (see FIG. 1(b)).

The space S (well) can be unsealed (FIG. 1(a) or sealed (FIG. 1(b) during transmission of the further first and/or further third electromagnetic signals and/or receipt of the further second and/or further fourth electromagnetic signals.

In this embodiment the third electromagnetic signal comprises or is one and the same as the first electromagnetic signal.

Also, in this embodiment the further third electromagnetic signal comprises or is one and the same as the further first electromagnetic signal.

The third position A comprises or B one and the same as the first position A.

The fourth position B comprises or is one and the same as the second position B.

The at least one variable or characteristic can comprise or include a permittivity of a material, e.g. fluid (gas/liquid) vapour within the space S or well.

The at least one variable or characteristic can comprise or include a ratio of fluid (F) to gas (G) (F/G ratio) within the space/well.

The at least one variable or characteristic can comprise or include a pressure (P) of a fluid/gas/liquid/vapour or liquid/gas mixture within the space/well.

The at least one variable or characteristic may be determined by: direct fluid/fluid and fluid/gas distance interface measurement. By rate of change over a period of time of such measurement. By rate of change to attenuation rates of similar scan from a electromagnetic signal to a second or third or more electromagnetic signals.

An embodiment of the present invention provides an apparatus for use in or for detecting, measuring and/or determining at least one downhole variable or characteristic in a space S, such as a well, container or vessel, the apparatus comprising:

an arrangement for transmitting a first electromagnetic signal from a first position to a feature within the space;

an arrangement for receiving a second electromagnetic signal at a second position after reflection of the transmitted first electromagnetic signal from the feature;

an arrangement for transmitting a third electromagnetic signal from a third position to a calibration feature within the space;

an arrangement for receiving a fourth electromagnetic signal at a fourth position after reflection of the transmitted third electromagnetic signal from the calibration feature;

an arrangement for transmitting a further first electromagnetic signal from the first portion to the feature within the space;

an arrangement for receiving a further second electromagnetic signal at the second position after reflection of the transmitted further first electromagnetic signal from the feature within the space;

an arrangement for transmitting a further third electromagnetic signal from the third position to the calibration feature;

an arrangement for receiving a further fourth electromagnetic signal at the fourth position after reflection of the transmitted further third electromagnetic signal from the calibration feature;

an arrangement for determining the at least one variable or characteristics from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

The arrangements for transmitting the first electromagnetic signal, the third electromagnetic signal, the further first electromagnetic signal and the further third electromagnetic signal advantageously comprise a single arrangement or transmitter transition elements (or antenna).

The arrangements for receiving the second electromagnetic signal, the fourth electromagnetic signal, the further second electromagnetic signal and the further fourth electromagnetic signal advantageously comprise a single arrangement or receiver transition elements (or antenna).

In use the position or level of the feature F may vary over time, e.g. due to fluid entry into the space S such that the well becomes "wet" or fluid exiting from the space S such that the well becomes "dry".

An oil, gas or water well is normally constructed using standard drilling techniques. The process of drilling the well is carried out using well control muds and fluids and is drilled at atmospheric pressure (see FIG. 6), The application of the FDR sensor becomes relevant during the completion phase where casing and tubing are installed to contain reservoir effluent (Water, Oil, Gas and Condensate). Once the well is completed a wellhead assembly is placed on the well and acts as a sealing structure at the well surface. Once the well has been perforated and induced to flow the wellhead will contain the pressurized gas and fluids and/or protect the well from ingress of foreign material (injection, dump flood or observation well).

Figures 6, 7, 8:
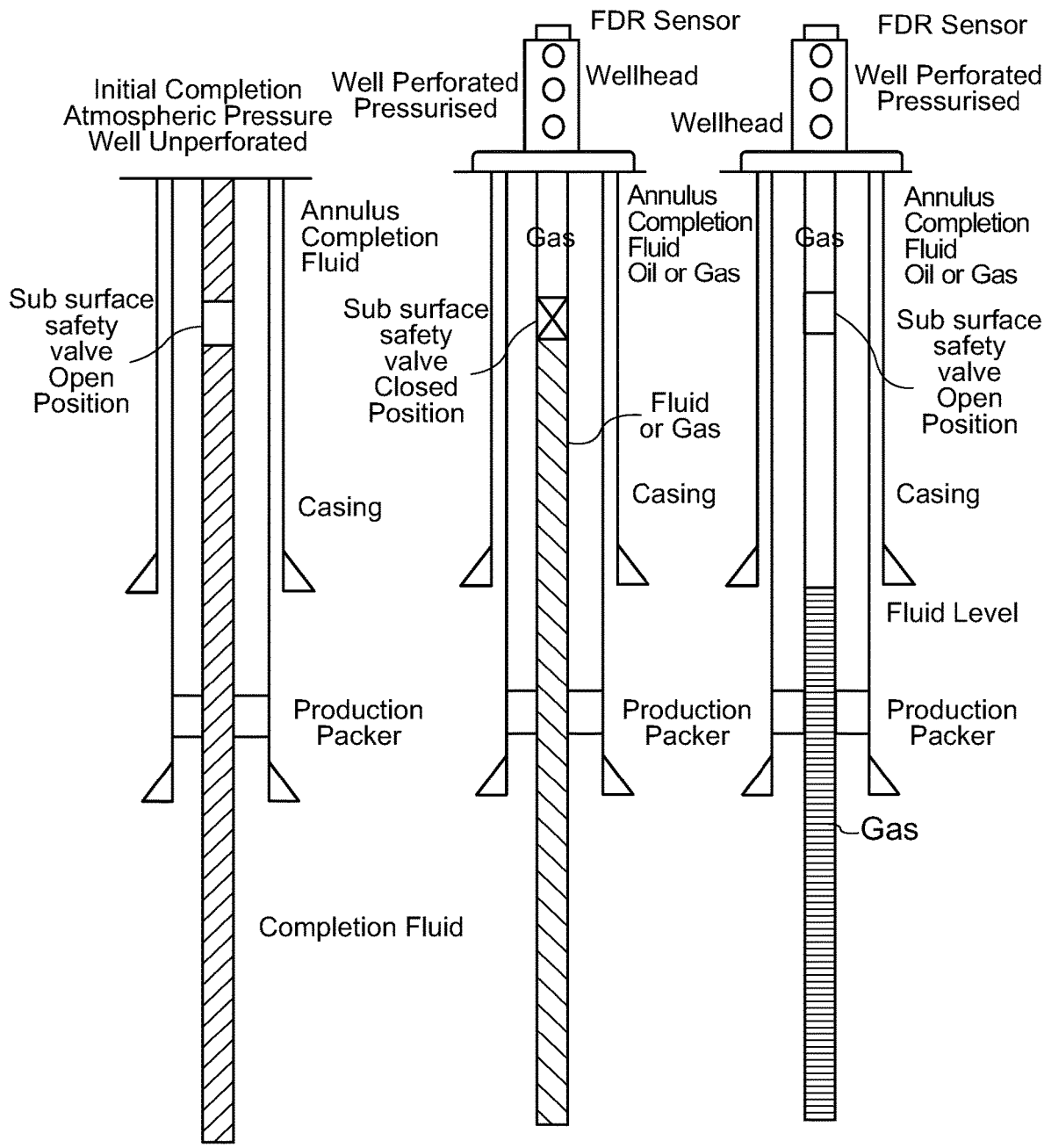
FIG. 6 a first schematic cross-sectional side view of a completed oil, gas or water well used in an embodiment of the present invention.
FIG. 7 a second schematic cross-sectional side view of the well of FIG. 6.
FIG. 8 a third schematic cross-section side view of the well of FIG. 6.

In gas wells it is normal to install a subsurface safety valve (SSSV) beneath the wellhead (see FIG. 7). The SSSV may be set at depths from approximately 100-1000 meters deep. The well is, therefore, sectioned into three pressure containing sections. The lower section from the reservoir to below the closed SSSV, the upper section from above the SSSV to a closed master Gate Valve in the Xmas Tree, and thirdly the ID section of the Xmas Tree from the closed gate valve to the Xmas Tree Cap (see FIG. 8).

The three sections provide structures for the FDR sensor to gain well information such as Fluid levels, Downhole and Shut in Wellhead Pressures and permittivity of contained produced fluids. This Information is normally required by reservoir and well engineers. These measurements can only be taken within a closed and sealed structure. Permittivity readings may be taken under flowing condition albeit the well structure at surface is still closed and under pressure control. Permittivity readings taken in flowing gas conditions will be able to detect 'wet gas' and increases and decreases of the liquid content of the gas, thus providing an in-well sensor capable of measuring fluid/gas ratios in gas wells. At certain Gas Liquid Ratio's (GLR's), i.e. high water or condensate rates, the sensor may not provide detailed and accurate data.

The FDR sensor will normally be placed below and attached to the XMT Cap pointing down the well conduit into the well effluent flow. The FDR sensor may be exposed to the flow intermittently by closing the XMT Gate Valve thereby isolating the sensor from the main well bore. This action can be carried out at any time during the producing phase of the well (see FIG. 9)

Figure 9:
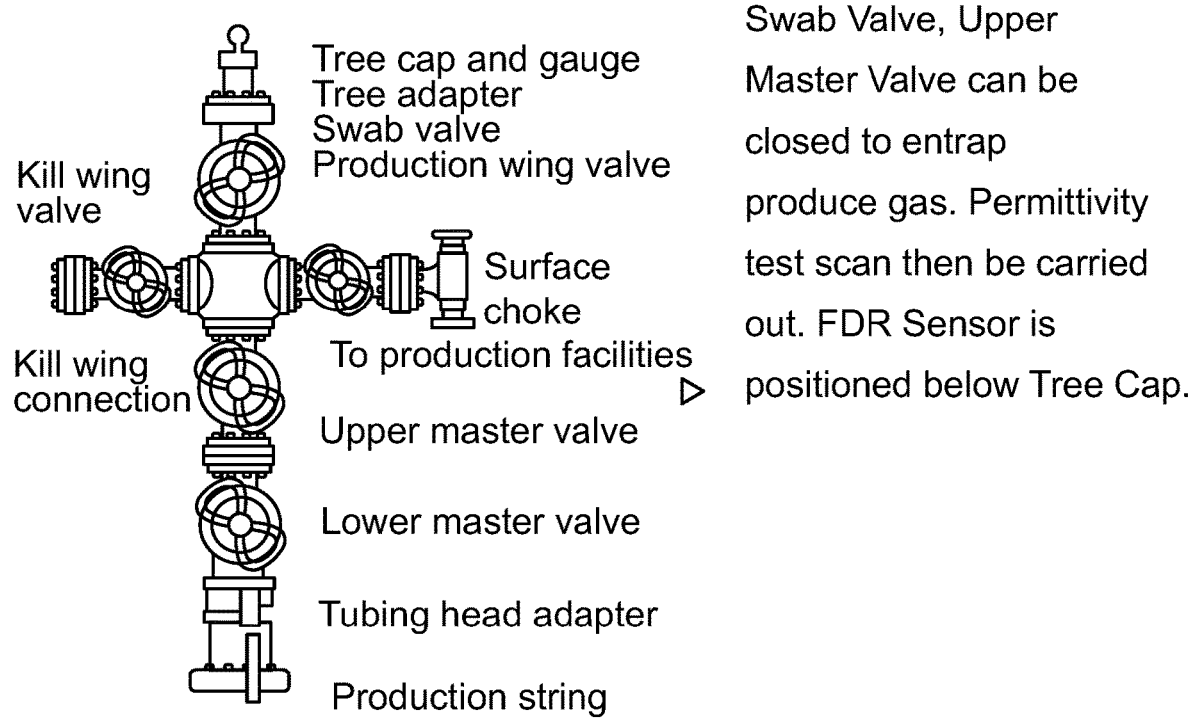
FIG. 9 a side view of a Christmas tree valve arrangement for use with the well of FIG. 6.

FIG. 9 shows a typical Xmas Tree (XMT) Assembly. The XMT, as shown, has three valves that can control the flow of well fluids. In the flowing position the Lower Master and Upper Master will be in the open position. The Swab Valve would normally be closed.

To scan the well either in the static or flowing modes the Swab Valve would be opened to allow the Microwave Scan to be beamed into the well conduit. If a fluid level has formed, in static mode, then the FDR sensor will measure and define the fluid level depth (FLD). In a gas well the FDR sensor can scan in the flowing or static mode. The scan will be able to provide a reflection from a known artefact, previously measured, in the well bore. The FDR reading obtained will be compared against the artefact information from which a determination of the gas permittivity can be obtained. The artefact can be in the completion string or within the XMT body. If in the XMT body a closed Lower Master, Upper Master or Swab valve would entrap produce gas allowing a measurement to be made.

The development of the FDR sensor has required that algorithms be developed to allow useful and accurate data sets to be transformed into meaningful and useable information Such algorithms have been developed by W3S and are necessary for FLD and other measurement to be formulated and calculated with a high degree of accuracy, repeatability and in a time-frame necessary for well management.

Herein below will be described effects of permittivity on the data sets obtained from a well using FDR and as such clearly explains why pressure control is necessary for a static and controlled regime to be established for measurement to be made. An Oil, Gas and Water well open to the atmosphere will not allow the FLD, Shut In Wellhead Pressure (SIWHP) or Fluid liquid Ratio data sets of any utility to be obtained/retrieved. However, a FLD can be obtained without pressure control being in-situ as permittivity at atmospheric pressure will not be affected (to a meaningful extent) by normal atmospheric changes/events or temperature.

Wave Propagation and Permittivity in a Well

Radar based ranging system will require the propagation velocity of generated signals to be known in order to derive distance measurements. From Maxwell's equations the velocity of an electromagnetic wave will depend on the permittivity of the medium through which it is propagating. In the simplest case of plane wave propagation, this relation is expressed by:

$$v_p = \frac{c}{\sqrt{\varepsilon_r \mu_r}},$$

where: $\varepsilon_r$ is the relative permittivity of the medium, $\mu_r$ is the relative permeability of the medium, c is the speed of light in a vacuum, and $v_p$ is the propagation velocity. In cases relevant to an oil and gas well, one can assume that $\mu_r=1$, so that this becomes:

$$v_p = \frac{c}{\sqrt{\varepsilon_r}}.$$

for waves travelling in an over-moded waveguide this relationship becomes slightly more complex because different frequencies travel at different speeds. Assuming the standard equation for group velocity this relationship becomes:

$$v_p = \frac{c}{\sqrt{\varepsilon_r}} \frac{\sqrt{f^2 - f_c^2}}{f}, \quad (1)$$

where: f is the wave frequency, $f_c$ is the waveguide cut off frequency, and $\varepsilon_r$ is the relative permittivity of the medium filing the waveguide.

A similar type of dependency will be true regardless of how the group velocity is estimated. If the medium through which the wave is propagating is composed of a number of chemical compounds (as will virtually always be the case an oil and gas well), in addition to the permittivity's of the individual components, a mixing rule model will be required to determine the overall permittivity. The standard method for describing the permittivity properties of a gas mixture is shown by using a simple method of mixtures approach:

$$P = \sum_i \phi_i^* P_i, \quad (2)$$

where: $\phi_i^*$ is a suitably derived fraction coefficient for the $i^{th}$ component gas, $P_i$ is the polarisation of the $i^{th}$ component and P Is the overall permittivity of the medium.

Once the polarisation of each component has been appropriately characterised, the overall dielectric constant can be obtained from relations such as the Clausius-Mosotti function:

$$\frac{P}{v} = \frac{(\varepsilon_r - 1)}{(\varepsilon_r + 2)}$$

if each component is non-polar (where v is the molar volume) or the Kirkwood equation:

$$\frac{P}{v} = \frac{(\varepsilon_r - 1)(2\varepsilon_r + 1)}{9\varepsilon_r}$$

If the gas contains any significant water content then water vapour will need to be included as one of the component gases.

On this basis the overall operation of a fluid level detection system for oil and gas wells can summarised as follows. Assume that a reflective target x is located at a depth d within the well. Then the operation of the system can be denoted by:

$$F(s, \varepsilon_r, t_d; X) = \tilde{d}, \quad (3)$$

where: s denotes a vector of parameters which describe the generated signal, $t_d$ is the tubing diameter, and $\tilde{d}$ denotes the estimate of the depth d.

Each of the raw input parameters S, $\varepsilon_r$ and $t_d$ determines some aspect of equation (1); in addition to $\varepsilon_r$, s will determine the frequency range over which equation (1) must be evaluated and $t_d$ determines the waveguide cut off frequency $f_c$.

To understand the importance of the pressure and temperature dependence of the permittivity and its impact on fluid level measurements, consider the following example.

A fluid level measurement (FLM) system is fitted to a well with a fluid level at 1000 m, with a gas column that consists of pure methane. Initial installation parameters at the surface wellhead are assumed to be as follows, surface pressure is at 1 atmosphere and the wellhead temperature is 25° C. The production tubing diameter is 2.992" and the signal group velocity for a TE11 mode signal is given by equation (1) at transmissions at a frequency of 30 GHz. Assume, for the sake of simplicity, that the pressure and temperature are uniform throughout the well. The relative permittivity of methane at these conditions is 1.000795 and under the stated conditions the time of flight of an electromagnetic pulse to travel from the wellhead to the fluid and back will be 6.694 pS. If this figure is multiplied by the propagation velocity as derived from equation (1) (2.9878E10) and divided by 2, the depth reading will be exactly 1000 m. If the pressure is now raised to 1000 PSI, the relative permittivity will increase to 1.0615, and the time of flight will be 6.894 μS, but if the permittivity used in the depth evaluation remains unchanged to measured depth will be 1029.89 m. An error in the measured fluid level of nearly 3% will be recorded and may be out with an acceptable error bandwidth deeming the data unfit for particle purposes to an oil and gas operator.

The relations considered thus far apply in situations where the conditions are uniform throughout the propagation path of the signal. However, in general the conditions within an oil and gas well will be far from uniform and in particular, both pressure and temperature will change with depth. Since permittivity is dependent on both pressure and temperature, it will be necessary to derive the value of the permittivity throughout the well in order to obtain accurate fluid level measurements.

To achieve this, it is necessary to quantify the effect of both pressure and temperature on the permittivity of the individual component gases within the wellbore across the entire range of probable conditions. The problem of measuring permittivity under varying pressure and temperature conditions has been extensively studied and techniques have been developed for obtaining permittivity values to a very high degree of accuracy. Moreover, a large amount of such data for the relevant gases already exists in the open literature. This data can then be converted to the polarisation $P_i$ required for the mixture model in Eq. (2). The resulting overall permittivity is denoted by $$\varepsilon_r = \varepsilon_r(p, T, g, w), \quad (4)$$

where: p is the pressure, T is the temperature in the gas column, g represents the gas composition excluding water and w represents the water component. This is done to denote the fact that $\varepsilon_r$ depends explicitly on the gas composition in the well (including water), but the water content is denoted separately because it is an important parameter from the point of view of the well performance.

It should be noted that, although for most gases the permittivity at given temperature and pressure conditions will be constant for frequencies from DC up to millimetre wave and beyond, this is not always the case. Consequently, frequency may need to be considered as an additional variable in some instances.

In addition, it will be necessary to derive the pressure and temperature distribution profile of the well. This involves the introduction of two further models. The first is an equation of state for the gas column, which describes the relationship between pressure, temperature and volume over the range of potential well conditions. This allows the mutual interaction of pressure and temperature to be described properly. Models of this type are widely used within the oil and gas industry and a number of models have been developed. They will invariably be calibrated using the available wellhead data (which would normally consist as a minimum of wellhead pressure but may include other variables such as temperature), and hence can be written in the form:

$$E(p, T, whd, g, w) = 0 \quad (5)$$

again, g and w are included specifically to denote the dependence on these two parameters.

The second model that now needs to be considered concerns the heat transfer from the gas column to the surrounding environment and vice versa. Whilst the temperature within the well is influenced by the pressure conditions, it is also affected by the temperature profile in the surrounding formation and the well components. Thus, to correctly describe the well temperature profile this heat transfer mechanism must also be accounted for. The model for this can be denoted by:

$$H(T, K, t), \quad (6)$$

where: K is a general variable that denotes all aspects of the well construction and surrounding environment that are relevant and t denotes time.

Again, this type of model is in routine use within the oil and gas industry to assist in managing both drilling and operational activities.

On the basis of the measured wellhead data and the gas composition for the well, equations (5) and (6) can be used to develop a pressure and temperature profile for the well. This can then be used in equation (4) to derive permittivity values that can then be used within the equation for the propagation velocity to determine fluid level measurements. It should be noted, however, that this method involves the use of a series of models on the basis of a very small number of measured wellhead parameters (often only one, possibly none at all). Such an approach involves a considerable amount of extrapolation and introduces the possibility of significant error in the derived measurements.

This situation can be greatly improved, however, by making use of features within the well tubulars that provide reference points at a pre-measured depth. Any oil and gas well will contain geometrical or other features that will cause reflected microwave signals to be generated and be detected at surface. Such features include but not limited to are tubing hangers, tubing connections, subsurface safety valves and other features within the wellhead and well tubulars. The placement of these features within the well will be accurately documented during well construction and hence the generated reflections can be correlated to a pre-measured depth. This allows that the accuracy of the derived permittivity values to be checked by comparing the measured (by microwave) depth of the features against the known depths. Any deviations can then be used to refine the pressure and temperature estimates such that the errors are reduced or eliminated. This, in effect, provides an additional set of data points against which the overall model can be calibrated, allowing a higher degree of measurement accuracy.

To utilize the features mentioned above, a process needs to be formulated. Assume that, in addition to all the other input data, we have a vector $x = \{x_1 \ldots, x_n\}$ of reflectors which are set at known depths $d = \{d_i, \ldots, d_n\}$. Then for each reflector the depth measurement process can be stated as:

$$F = (s, \varepsilon_r(p, T, g, w), E(p, T, whd, g, w), H(T, K, t), t_d; x_i) = \tilde{d}_i, \quad (7)$$

where: F now contains all the elements required to evaluate the permittivity $\varepsilon_r$. This can be written in a more conventional form by identifying the vector of inputs:

$$u = (s, t_d, whd, g, K) \quad (8)$$

and the vector of parameters:

$$\beta = (p, T, w), \quad (9)$$

so that equation (7) becomes:

$$F(u, \beta, t; x_i) = \tilde{d}_i. \quad (10)$$

the process can now be stated as one of parameter estimation, whereby the purpose is to identify the parameter values such that:

$$\underset{\beta}{\mathrm{argmin}} O(\tilde{d} - d), \quad (11)$$

where: O is a suitably defined objective or cost function. Stated another way, we optimise the values of the parameter vector $\beta$ so that the difference between the estimated and known depths of the reference reflectors is minimised, as measured by the function O. It may also be beneficial to use more than one objective function to extract different features of the error as an aid to the overall optimisation.

The presence of the time parameter t in equation (6) (and consequently equation (10)) provides an opportunity to further optimise the output. Whilst the response of the equation of state (5) to a change in the flow conditions will be, to all intents and purposes, instantaneous, the heat transfer mechanism is active over much longer time scales. This means that, following a significant change in flow conditions, the estimated depths $\tilde{d}$ will continue to change over some period of time, even if all other factors are held constant. By tracking these changes over time, additional information can be obtained specifically related to the heat transfer, effectively providing additional sets of data points against which the model can be calibrated.

In carrying out this optimisation, the output is an estimate of the pressure and temperature profiles and the water content of the produced effluent in the wellbore that have been fully calibrated against the set of reference points x. These reference points, of course, only exist by virtue of the microwave fluid level measurement system. The p,T,w estimates can then be used to obtain accurate measurements of the level from any other reflections observable within the well conduits. Alternatively, these estimates could simply be used on their own to provide more detailed and accurate data than could be obtained from using the measured wellhead pressure and temperature.

Finally, we note that in certain circumstances a very small changes in permittivity will be of interest, providing data relating to changes in the measured target depths that are normally difficult or impossible to detect using the standard measurement techniques utilizing the frequency of the returned signal. In this case a high degree of resolution can be achieved using the phase information present in the returned signal in addition to the frequency.

It will be appreciated that one or more embodiments of the present invention may provide one or more of the following characteristics, advantages and/or utilities:

System works at atmospheric conditions.
System works in vacuum through to 15,000 psi and higher.
System works inside metallic and non-metallic structures.
System works inside pressure sealed structures.
System works inside open structures.
Suitable for fluid level measurement static and dynamic.
System suitable for operation in hazardous environments.
Suitable for multiple interface measurements such as gas/water, gas/oil, gas/water and gas/oil/water.
Measurement of Oil Rim Thickness
Measurement of rate of change to wellbore fluid level position.
Suitable for injection, producing, disposal and observation wells.
Suitable for producing hydrocarbon wells.
Suitable for producing water wells.
Fluid level measurements can be expressed as pressure in the structure or at sensor.
Sensor detects dielectric anomalies.
Sensor detects permittivity changes to gases due to pressure.
Sensor detects permittivity changes to fluid content. Wet Gas for example.
Sensor readings can be compensated for temperature effects.
Sensor is suitable for all sizes of structures 20 mm through 360 mm and higher.
System provides method of correlation to a fixed datum inside structure.
A fixed datum indicator can be built into a structure such as a oil, gas or water well for use as measurement reference point such as a tubing coupling, casing coupling, closed sub-surface safety valve, gate valve on wellhead or dedicated tube or fixture inserted into the structure.
Measuring changes to permittivity of gasses to provide fluid level depths and pressures in static or flowing wells.
Sensor measurements are made without an intervention into the structure. Contactless measurement.
Sensor uses low power microwave scans typically −3 dBm.
FDR measurements under pressure control in Annulus and Tubing.
FDR measurements in a open or enclosed structure.

Figure 10:
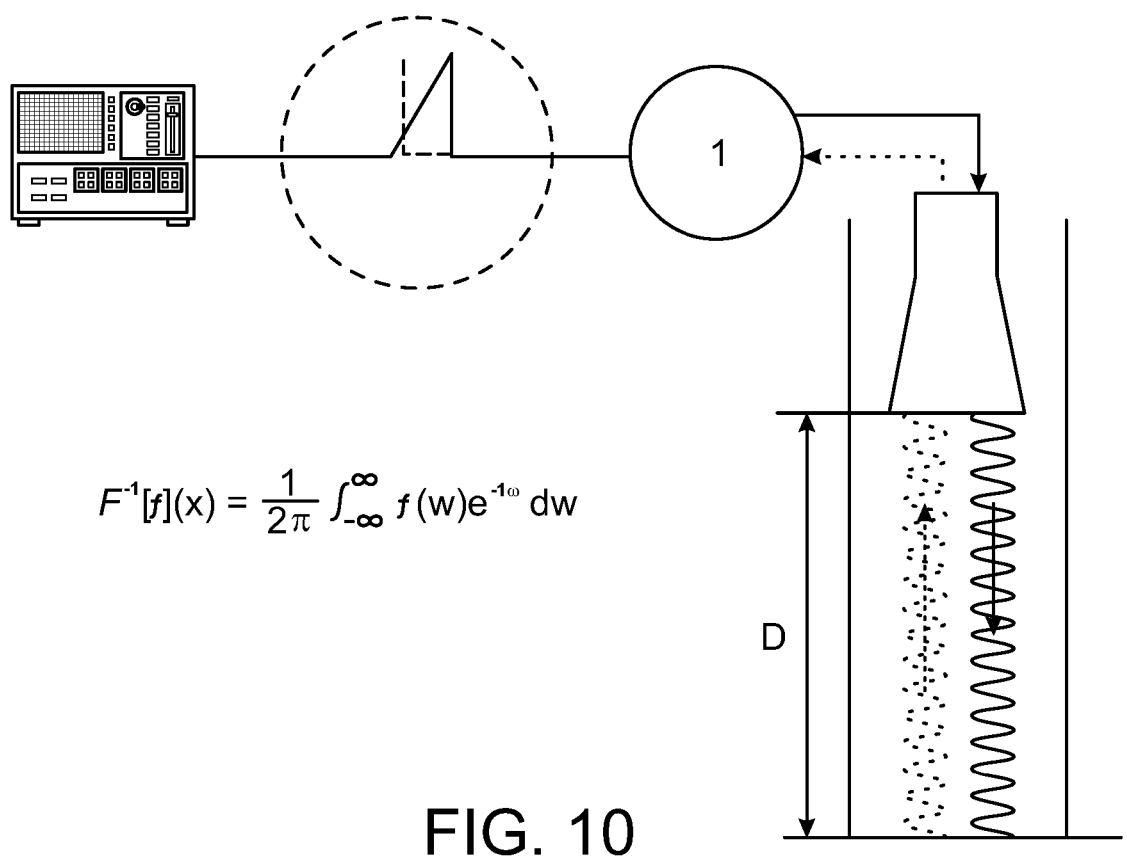
FIG. 10 a schematic diagram of a system according to an embodiment of the present invention.

Referring now to FIG. 10 there is shown a schematic of a system for use in a measured and/or detection method according to an embodiment of the present invention.

Figure 11:
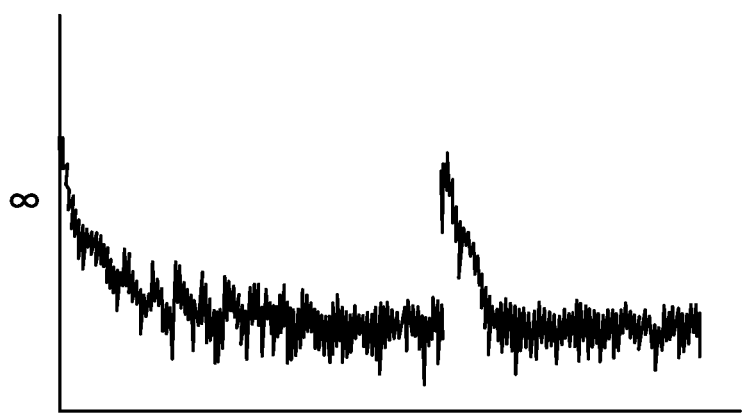
FIG. 11 an output trace from the system of FIG. 10.
Figure 12:
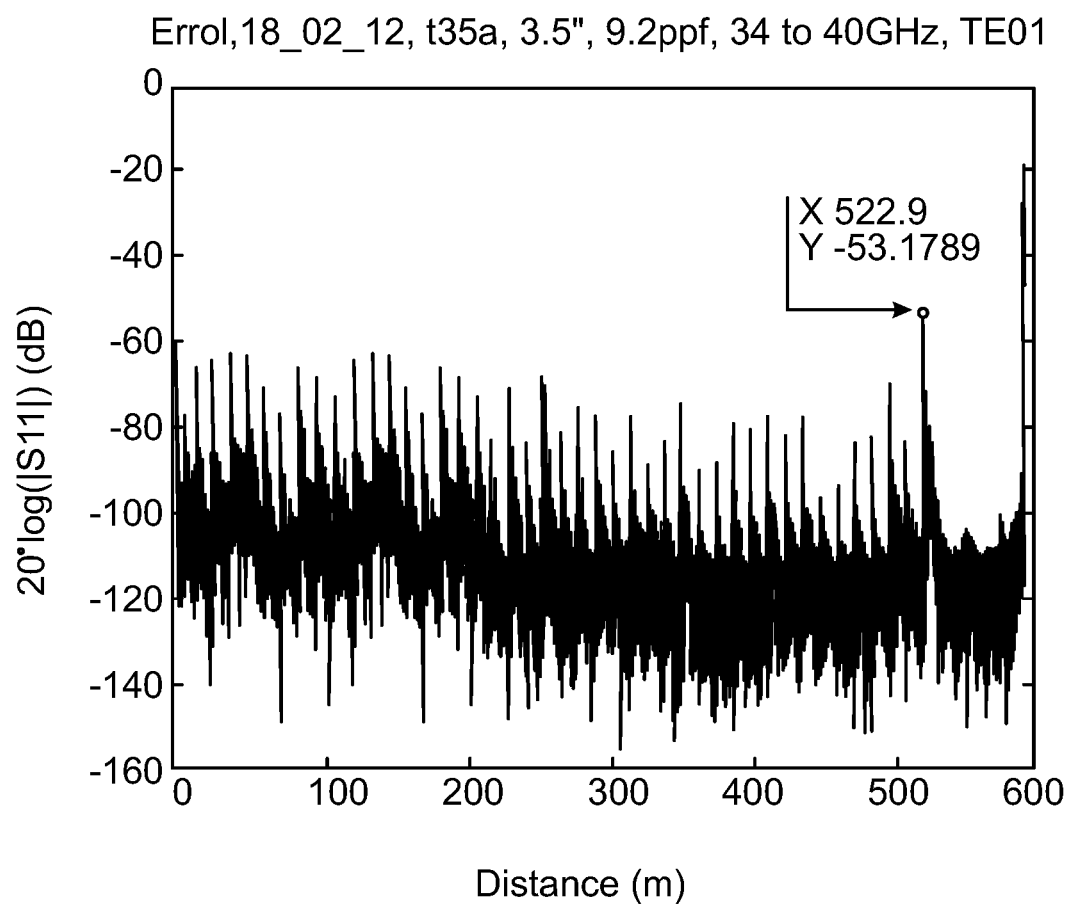
FIG. 12 a further output trace from the system of FIG. 10.
Figure 13:
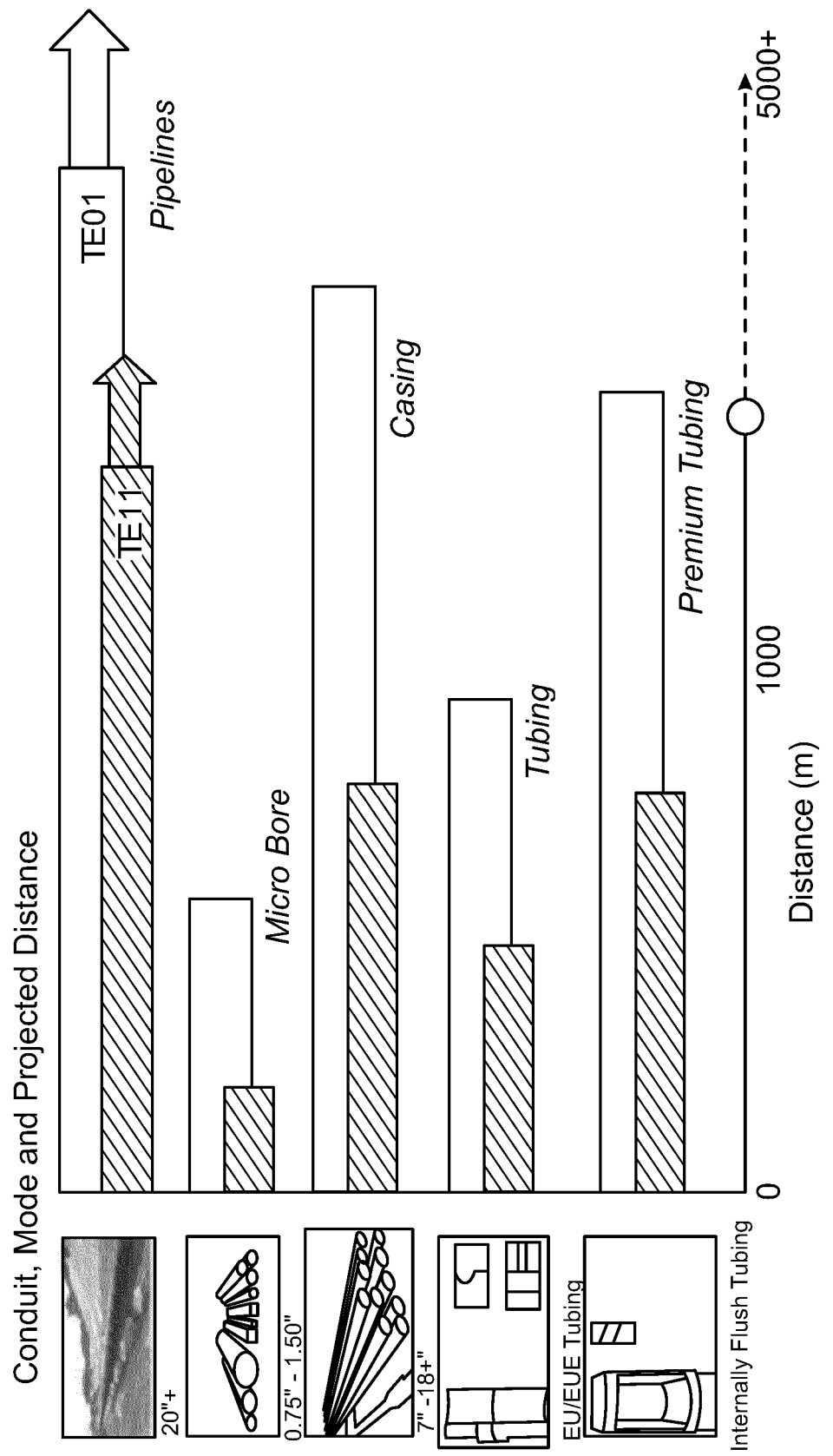
FIG. 13 a pictorial representation of various possible uses of a system according to FIG. 10 including indicative depths, modes and tubulars.
Figure 14:
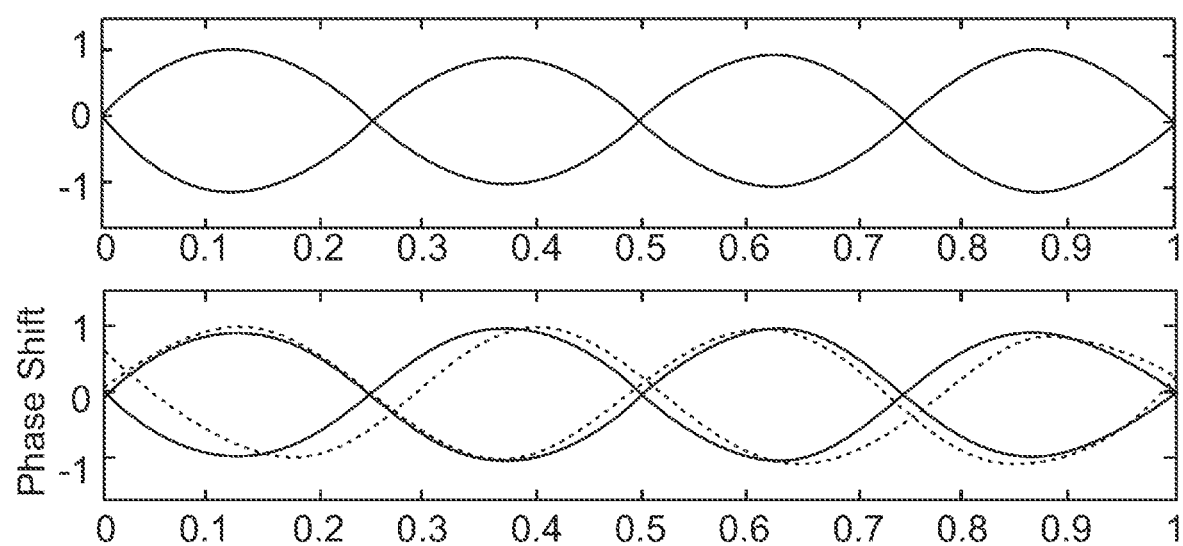
FIG. 14 an illustration of a phase shift in a system according to FIG. 10.
Figure 15:
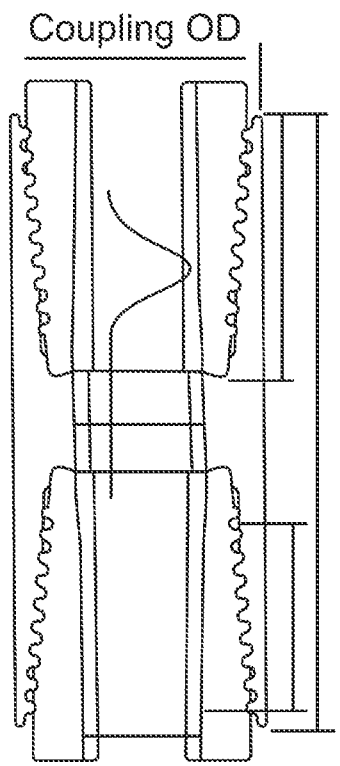
FIG. 15 an illustration of a signal reflection from a calibration feature in a system according to FIG. 10.
Figure 16:
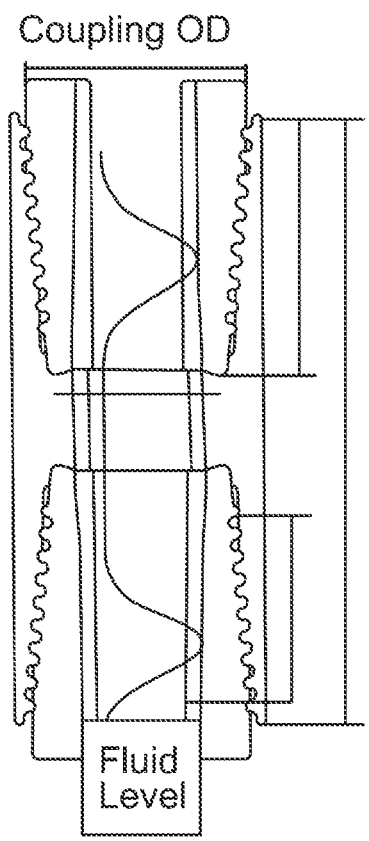
FIG. 16 an illustration of signal reflection from a calibration feature and from a fluid interface in the system of FIG. 10.
Figure 17:
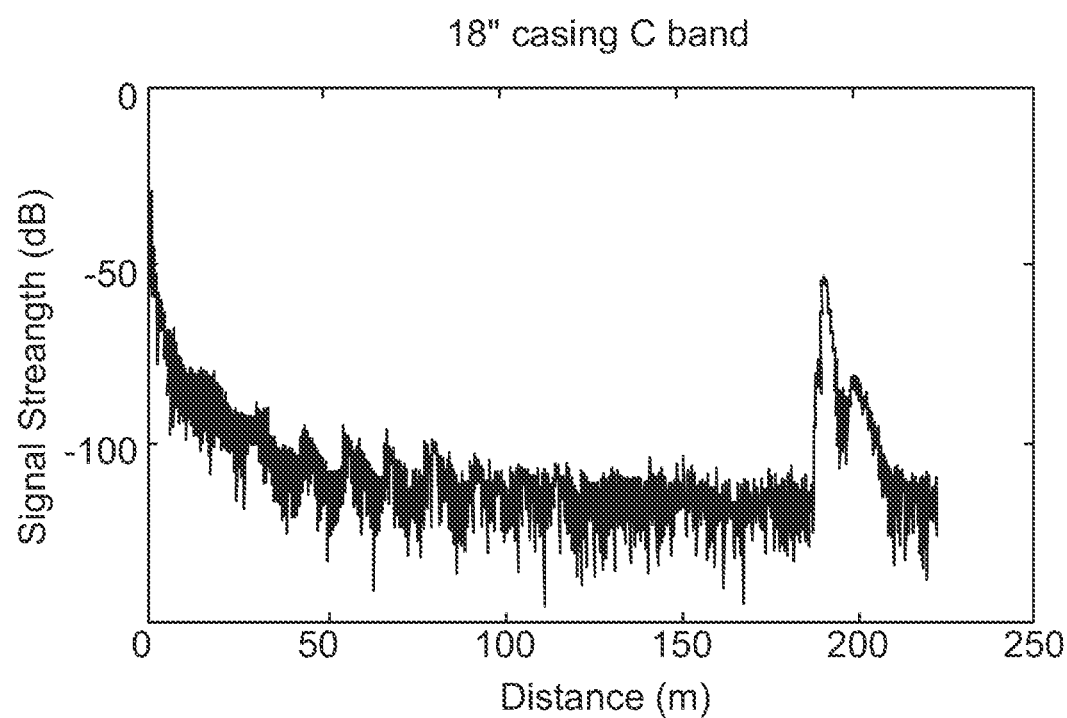
FIG. 17 an output trace from the system of FIG. 10.
Figure 18A:
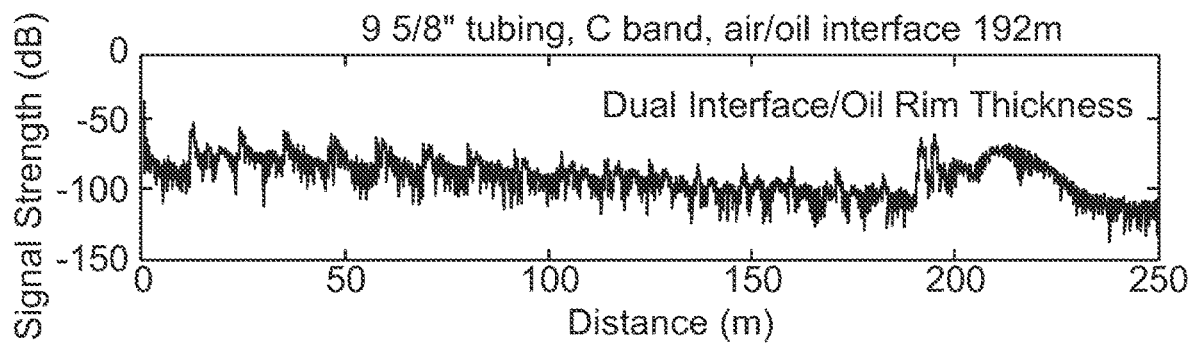
FIGS. 18(a) and (b) output traces from the system of FIG. 10.
Figure 18B:
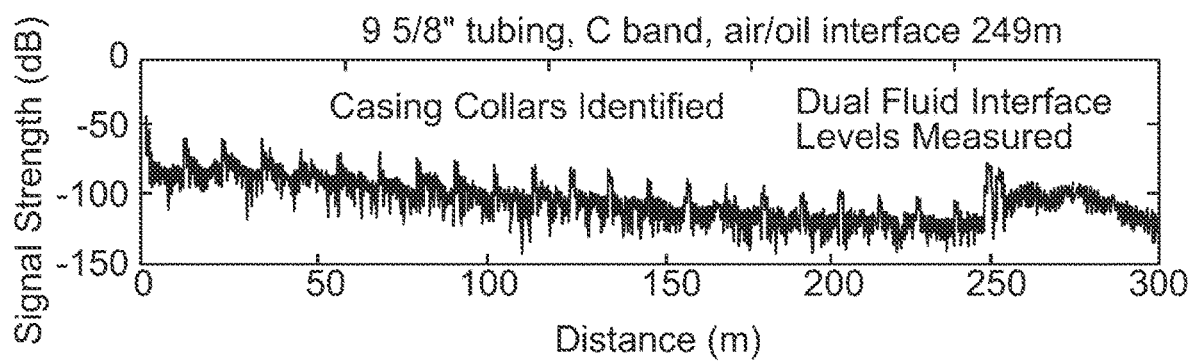
Figure 19A:
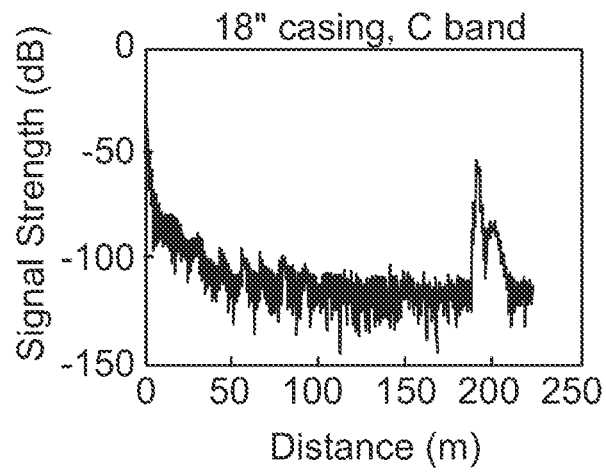
FIGS. 19(a) and (b) output traces from the system of FIG. 10.
Figure 19B:
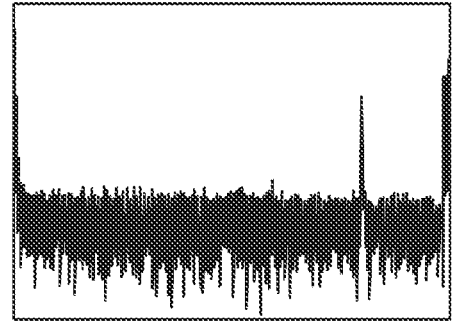
Figure 20A:
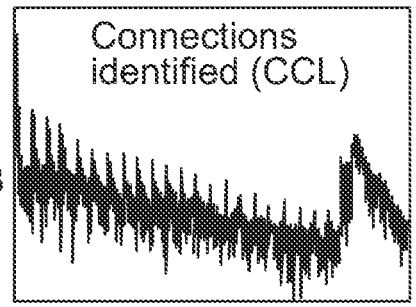
FIGS. 20(a) and (b) output traces from the system of FIG. 10.
Figure 20B:
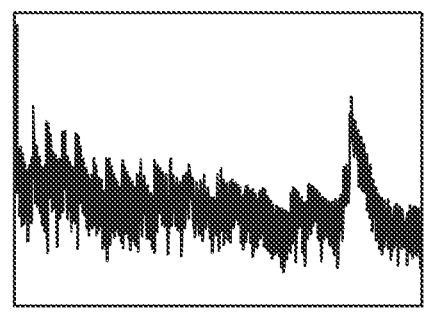
Figure 21A:
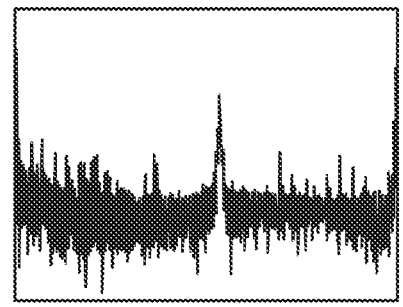
FIGS. 21(a) and (b) output traces from the system of FIG. 10.
Figure 21B:
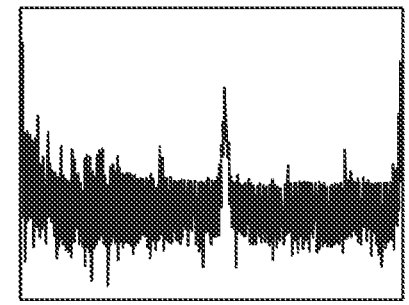
Figure 22A:
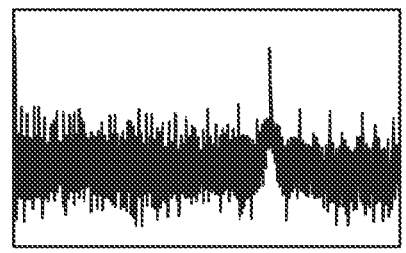
FIGS. 22(a) and (b) output traces from the system of FIG. 10.
Figure 22B:
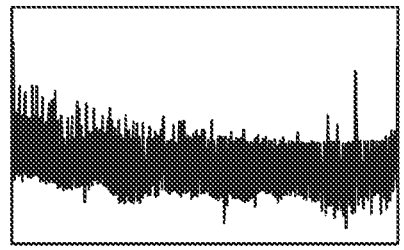
Figure 23A:
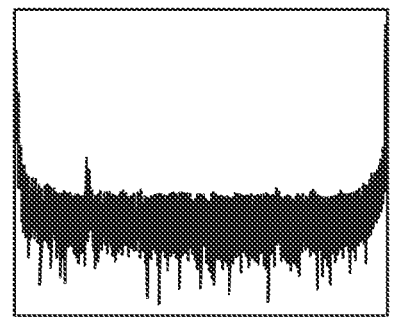
FIGS. 23(a) and (b) output traces from the system of FIG. 10.
Figure 23B:
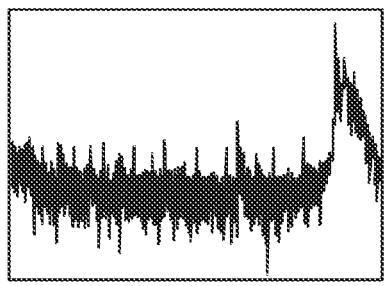

FIG. 11 shows a first graphical representation of detection of a downhole feature in a well. FIG. 12 shows a second graphical representation of detection of another downhole feature in a well. FIG. 13 shows likely detection depths in methods according to the present invention for a number of pipe liners/conduits/tubing. FIG. 14 shows a phase shift in a signal in the system of FIG. 10. FIG. 15 shows a third graphical representation of detection of a downhole feature in a well. FIG. 16 shows a fourth graphical representation of detection of a downhole feature in a well.

Hereinafter the following terminology and/or abbreviations will be used:

FDR—Frequency Domain Reflectometry
TDR—Time Domain Reflectometry
TE-nn Mode—Transverse Electrical mode exist when boundary condition are imposed such as a waveguide; electromagnetic field pattern of radiation in a plane perpendicular to wave propagation.
TE11—Coaxial to waveguide mode. Standard Gain.
TE01—Low loss mode.
Transition—Mechanical connection between Microwave source and Well
Wave-guide—circular tube, pipe, structure of any ID (Inner Diameter).
Cut-off Frequency—A Frequency that will not propagate inside a set pipe ID
VNA—Vector Network Analyser. Microwave transceiver.
Reflectometer—One port VNA.
FLM—Fluid Level Measurement.
FLD—Fluid Level Depth.

Limitations of Known FLM
Continuous monitoring solutions include that:
Such typically employ downhole electronic or fibre optic or pressure gauges that can fail or drift.
Casing-deployed systems can only be installed at time of well drilling.
Tubing-deployed systems can only be installed at time of well completion.
Insert systems are suspended from the wellhead involve interruptions to well production.
Such have a high total system cost (gauge, mandrel, TEC, protectors, wellhead outlet).
Installation crew are required during each workover, increasing OPEX.
Computation of fluid level involves knowledge of casing pressure and effective density of liquid and gas columns.

Limitations of Known FLM
Periodic (drive-by) monitoring solutions include that:
Installation operations are costly.
Survey times are long, limiting number of surveys that can be performed daily.
Use of different gauges between surveys can result in inconsistent measurements.

However, according to the present invention FDR-FLM sensors provide:
Non-contact measurement technology.
No through wellhead intervention.
Immediate SRO. No Interpretation delay.

Measure static FLD.

Measure dynamic FLD.

Measure dual fluid interfaces (Oil rim thickness determination).

Measure SIWHP/FWHP*.

Measure Water Cut*(Measurement made at wellhead).

Provide a CCL via FDR for depth correlation when required.

For Frequency Domain Reflectometry (FDR) according to the present invention:

The lowest frequency of the frequency range is based on the cutoff frequency for the internal diameter of the pipe being investigated.

The minimum operating frequency of the system should be a minimum of 15% above the cutoff.

In at least one embodiment of the present invention FDR works by:

Using Radio Frequency (RF) and Microwave (MW) technology.

Production Tubing acting as 'WAVEGUIDE'.

An annulus acting as a 'COAXIAL CABLE'.

Transmitting MW 'pulses' of predetermined frequencies and bandwidths through a gas filled section of a well.

MW transmitted and received by surface mounted Transition.

MW pulses being reflected by water, oil, steel and other materials (Differing Dielectric Constants).

Frequency Domain Reflectometry (FDR)

Beneficially requires a minimum of two frequencies to be transmitted:

Frequencies beneficially are to be closed spaced (10 MHZ)

A frequency bandwidth is selected on the reflectometer e.g. 2 GHz.

The number of points is decided e.g. up to 100,001+.

The number of individual frequencies transmitted is called the number of points.

Stepped through from the low to high frequency of the bandwidth.

Bandwidth/points=Step Size.

Each frequency is then separately transmitted over time and its amplitude and phase shift measured.

Analysis of the phase shift using IFFT provides depth.

Frequency Domain capabilities include:

Static/Dynamic Fluid Level Measurement through Gas.

Bottom Hole Pressure (by extrapolation).

Surface Shut-In Wellhead Pressure).

Water-Cut Measurement

Dual interface Fluid Level Measurement (OWC through gas).

Depth range 0-2000 meters (tubing configuration dependent).

Tubing Surveillance (change over time of internal properties).

'Drive By' or Permanent Installation.

FDR-FLM applications include:

Oil, Gas and Water Wells. Production, injection, observation wells.

Coal Bed Methane applications for dewatering and submersible pump control.

Mining sector (Bore Holes).

Replacement technology for Bottom Hole Pressure Gauges.

Well Integrity and Condition Monitoring.

De-commissioning Surveillance.

Inter-alia earthquake monitoring, etc.

FDR-FLM advantages include:

Contactless Measurement.

Intervention-less.

Fast SRO

Accuracy. Better than current BHPG technology.

Typical Scan rate 5-10 seconds (fluid level depth dependent).

High Level of Repeatability

Zero instrumentation drift.

Fast Rig Up/Down Times (15 mins typical for Drive-by).

Low power usage.

HSE compliant.

Light weight and air transportable.

Well application range 1" through 18"+tubing/casing sizes.

Pipeline application.

Transmits inside Steel, GRP and PVC tubulars.

Can detect Scale build-up.

Referring now to FIGS. 24(a) to 27 an embodiment of the present invention will be described which provides for fluid level measurement in a well, e.g. a gas well, using Frequency Domain Reflectometry or Frequency Modulated Continuous Wave Reflectometry. (FMCW should be included as and where required) or similar technique that transmits and receives MW signals.

FIGS. 24(a) and (b) show illustrations of actual and detected (perceived) spacing or separation between a feature and a calibration feature according to an embodiment of the present invention.

Figure 25:
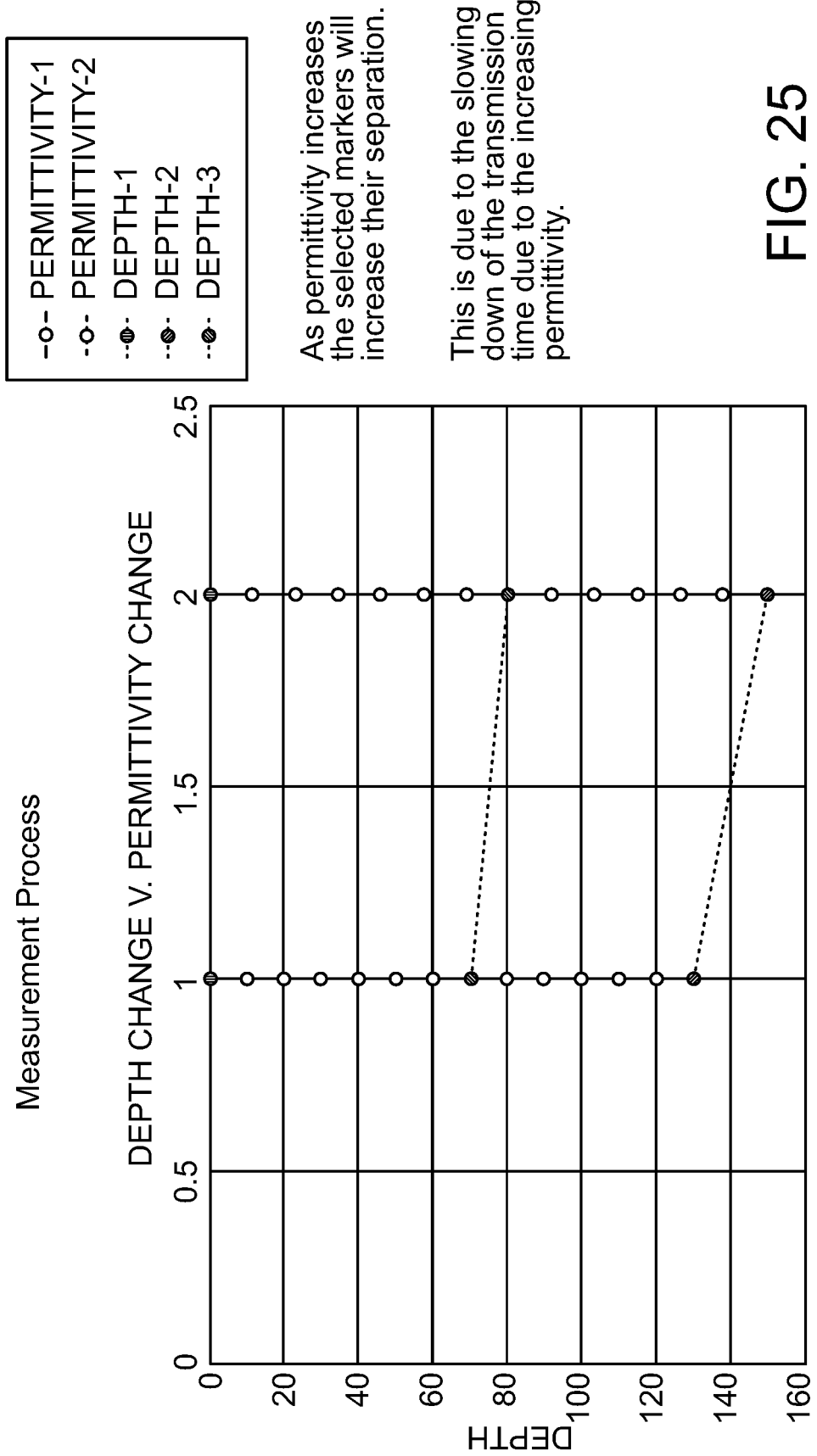
FIG. 25 a graph relating (detected/perceived) depth change and permittivity.

FIG. 25 shows a graph relating (detected/perceived) depth change and permittivity.

Figure 26:
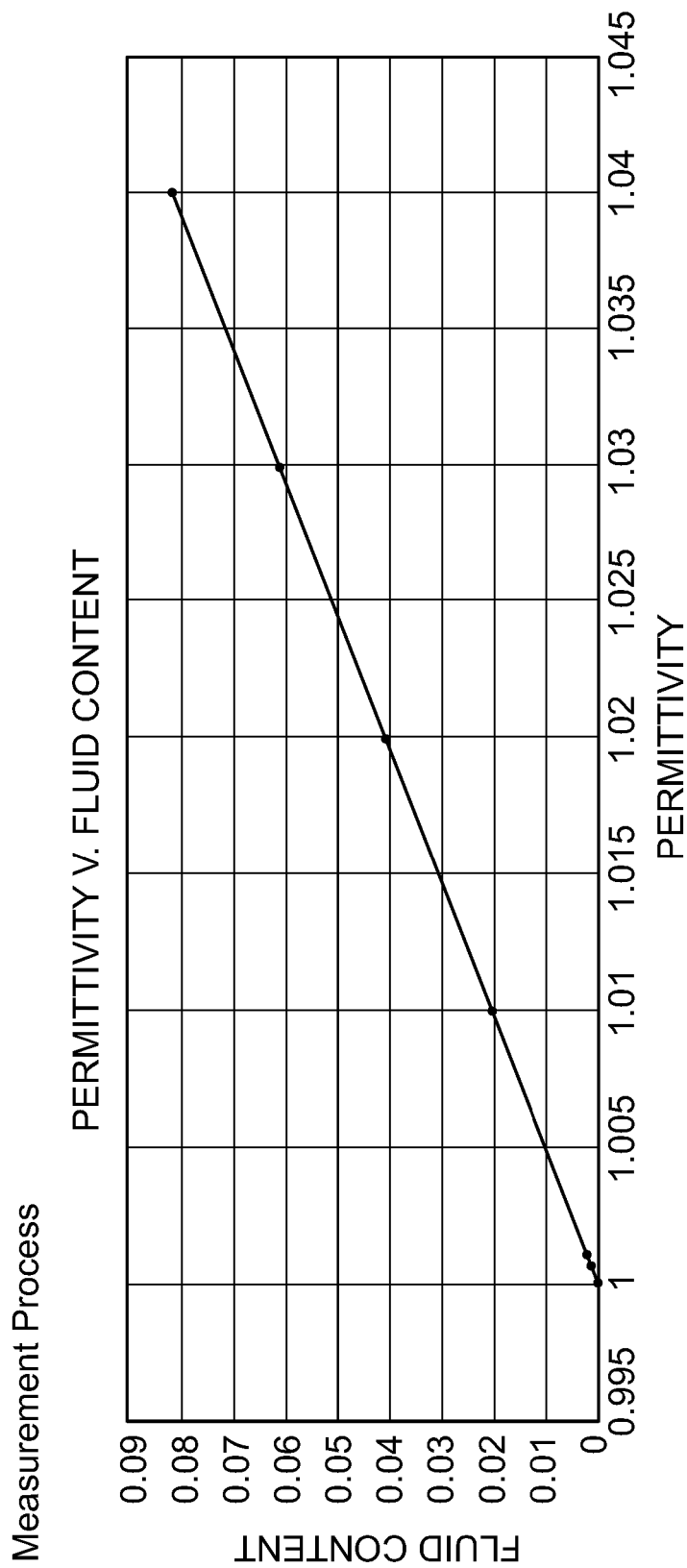
FIG. 26 a graph relating permittivity and fluid content.

FIG. 26 shows a graph relating permittivity and fluid content.

Figure 27:
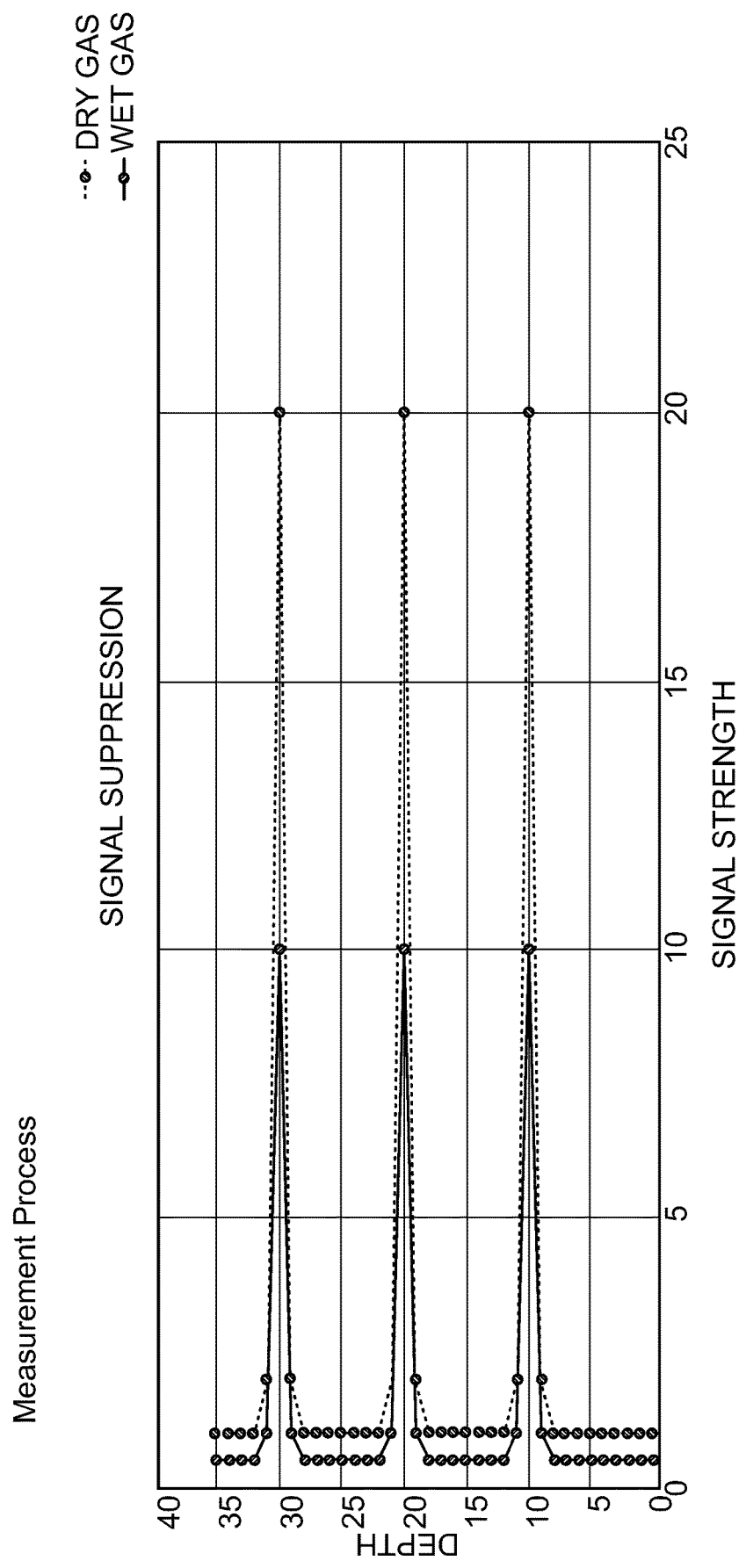
FIG. 27 a graph relating signal strength and/or signal suppression with depth.
Figure 28:
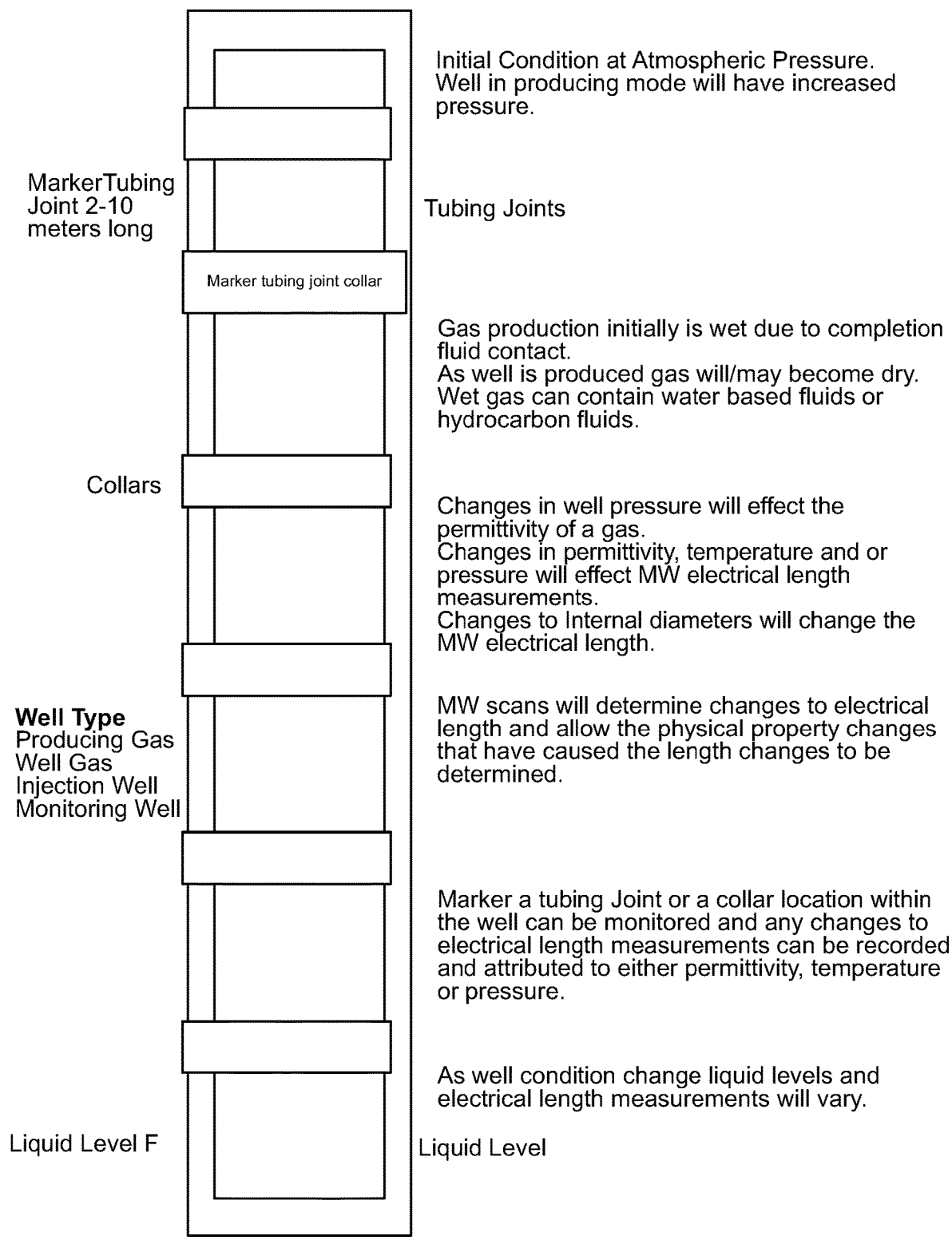
FIG. 28 a schematic view of an oi, gas or water well utilised in an embodiment of the present invention.

FIG. 27 shows a graph relating signal strength and/or signal suppression with depth.

Objective

An objective of the embodiment is to determine the effects of temperature, pressure and liquid/fluid ratio components of a gas, within a well conduit, on fluid or liquid level measurements using Frequency Domain Reflectometry: and FMCW Utilizing the individual tubing joint lengths (pipe tally) measure the perceived measured length change caused by changes to the flowing gas parameters.

Determine the effects of each of the individual components.

Determine changes and or rate of change to liquid/gas ratios.

Introduce an 'indicator' tubing joint or marker; the marker can be an introduced feature that provides a strong MW reflection response from the MW signal injected into the tubular. in upper completion and utilize as a measurement marker (or calibration feature).

Permittivity Variables

Changes in measured reflector depths are due to changes in the permittivity of the gaseous environment. Permittivity changes are related to:

Composition of well fluids:
  Gas composition
  Type of lifted fluids
  Percentage of lifted fluids
Pressure
Temperature.

Movement of Markers—Process of Measurement

In a gas well it is possible to observe the change in spacing of mechanical markers (physical positions) due to change in permittivity.

The selected markers will move apart as permittivity increases due to increased amounts of lifted fluid.

The degree of change in spacing of the markers can be correlated to the amount of lifted fluid.

This assumes no change in the position of the mechanical markers due to well conditions (expansion/contraction/buckling of pipe).

Measurement Process

Change in distance between markers is due only to changes in permittivity.

If gas composition, pressure and temperature have not changed then permittivity change can only be due to a change to fluid/gas ratio.

The change in lifted fluids can then be corelated to the change in permittivity

If there are known changes to the temperature and pressure then corrections can be made for these changes.

Other Observable Effects

As the liquid content increases, there will also be a suppression (attenuation) of the signal transmitted in the well.

At present there is no accurate information to ascertain the water percentage that will fully attenuate the transmitted signal.

Previous testing on a flow loop indicated up to 3% water cut could be detected in a horizontal flow position using 2.4 GHz microwave transmissions According to embodiments of the invention herein before described, the present invention provided a method of or for use in or for detecting, measuring and/or determining at least one variable or characteristic in a space, such as a well, container or vessel, the method comprising (initially):

determining a first parameter related to a first physical distance between a (fixed) position (marker) and a feature within the space;

determining a second parameter related to a second physical distance between the position and a (fixed) calibration feature (marker);

the method comprising (subsequently):

determining a further first parameter related to a first perceived or detected distance between the position and the feature;

determining a second further parameter related to a second perceived or detected distance between the position and the calibration feature;

the method comprising (thereafter):

determining (the) at least one variable or characteristic from a (first) difference or variation between the first parameter and the further first parameter and a (second) difference between the second parameter and the further second parameter, for example, the first physical distance and the first perceived distance and a (second) difference or variation between the second physical distance and the second perceived distance.

Between the initial steps and subsequent steps, the method typically comprises the step of sealing the space (well).

Between the initial steps and subsequent steps, the method can typically comprise the step of pressurising the space (well).

In a first implementation, the step of determining a first parameter related to a first physical distance between a (fixed) position and a feature within the space comprises:

transmitting a first electromagnetic signal from a first (fixed) position to a feature within the space;

receiving a second electromagnetic signal at a second (fixed) position after reflection of the transmitted first electromagnetic signal from the feature.

In said first implementation, the step of determining a second parameter related to a second physical distance between the position and a (fixed) calibration feature may comprise:

transmitting a third electromagnetic signal from a third position to a calibration feature within the space;

receiving a fourth electromagnetic signal at a fourth position after reflection of the transmitted third electromagnetic signal from the calibration feature.

In a second implementation, the step of determining a first parameter related to a first physical distance between a (fixed) position and a feature within the space can comprise:

transmitting a first electromagnetic signal from a first (fixed) position to a feature within the space;

receiving a second electromagnetic signal at a second (fixed) position after reflection of the transmitted first electromagnetic signal from the feature.

In a second implementation, the step of determining a second parameter related to a second physical distance between a (fixed) position and a calibration feature within the space can comprise:

using or utilising a pipe tally or known number of tubing lengths or tubing joint lengths ("pipe tally") between the position and the calibration feature.

In any implementation, the (subsequent) step of determining a further first parameter related to a first perceived or detected distance between the position and the feature can comprise:

transmitting a further first electromagnetic signal from the first portion to the feature;

receiving a further second electromagnetic signal at the second position after reflection of the transmitted further first electromagnetic signal from the feature.

In any implementation, the (subsequent) step of determining a further second parameter related to a second perceived or detected distance between the position and the calibration feature can comprise:

transmitting a further third electromagnetic signal from the third position to the calibration feature;

receiving a further fourth electromagnetic signal at the fourth position after reflection of the transmitted further third electromagnetic signal from the calibration feature.

In one or more implementations, the step of determining (the) at least one variable or characteristic from a (first) difference or variation between the first parameter and the further first parameter and a (second) between the second parameter and the further second parameter and/or determining (the) at least one variable or characteristic from a (first) difference the first physical distance and the first perceived distance and a (second) difference or variation between the second physical distance and the second perceived distance can comprise:

determining (the) at least one variable or characteristics from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

According to the disclosed embodiments of the present invention there is provided an apparatus for use in or for detecting, measuring and/or determining at least one downhole variable or characteristic in a space, such as a well, container or vessel, the apparatus comprising:

- an arrangement or means for determining a (first parameter related to a) first physical distance between a (fixed) position and a feature within the space;
- an arrangement or means for determining a (second parameter related to a) second physical distance between the position and a (fixed) calibration feature;
- an arrangement or means for determining a (further first parameter related to a) first perceived or detected distance between the position and the feature;
- an arrangement or means for determining a (further second parameter related to a) second perceived or detected distance between the position and the calibration feature;
- an arrangement or means for determining (the) at least one variable or characteristic from a (first) difference or variation between the first parameter and the further first parameter and a (second) difference or variation between the second parameter and the further second parameter, such as a (first) difference or variation between the first physical distance and the first perceived distance and a (second) difference or variation between the second physical distance and the second perceived distance.

The apparatus typically comprises a sealing arrangement for sealing the space (well).

The apparatus can typically comprise a pressurising arrangement for pressurising the space (well).

In a first implementation, the arrangement or means for determining a (first parameter related to a) first physical distance between a (fixed) position and a feature within the space can comprise:

an arrangement for transmitting a first electromagnetic signal from a first position to a feature within the space;
an arrangement for receiving a second electromagnetic signal at a second position after reflection of the transmitted first electromagnetic signal from the feature.

In said first arrangement, the arrangement or means for determining a (second parameter related to a) second physical distance between the position and a (fixed) calibration feature can comprise:

an arrangement for transmitting a third electromagnetic signal from a/the third position to a calibration feature within the space;
an arrangement for receiving a fourth electromagnetic signal at a fourth position after reflection of the transmitted third electromagnetic signal from the calibration feature.

In a second implementation, the arrangement or means for determining a (further first parameter related to a) first physical distance between a (fixed) position and a feature within the space can comprise:

an arrangement for transmitting a first electromagnetic signal from a first position to a feature within the space;
an arrangement for receiving a second electromagnetic signal at a second position after reflection of the transmitted first electromagnetic signal from the feature.

In a second implementation, the arrangement or means for determining a (second parameter related to a) second physical distance between the position and a (fixed) calibration feature can comprise:

a memory or storage arrangement or means for storing a pipe tally or known number of tubing lengths or tubing joint lengths ("pipe tally") between the position and the calibration feature. The pipe tally can be established on completion of the well.

In any implementation, the arrangement or means for determining a (further first parameter related to a) first perceived or detected distance between the position and the feature can comprise:

an arrangement for transmitting a further first electromagnetic signal from the first portion to the feature within the space;
an arrangement for receiving a further second electromagnetic signal at the second position after reflection of the transmitted further first electromagnetic signal from the feature within the space.

In any implementation, the arrangement or means for determining a (further second parameter related to a) second perceived or detected distance between the position and the calibration feature can comprise:

an arrangement for transmitting a further third electromagnetic signal from the third position to the calibration feature;
an arrangement for receiving a further fourth electromagnetic signal at the fourth position after reflection of the transmitted further third electromagnetic signal from the calibration feature.

In any implementation, the arrangement or means for determining (the) at least one variable or characteristic from a (first) difference or variation between the first parameter and the further first parameter and a (second) difference or variation between the second parameter and the further second parameter the arrangement or means for determining (the) at least one variable or characteristic from a (first) difference or variation between the first physical distance and the first perceived distance and a (second) difference or variation between the second physical distance and the second perceived distance can comprise:

an arrangement for determining the at least one variable or characteristics from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

The arrangements for transmitting the first electromagnetic signal, the third electromagnetic signal, the further first electromagnetic signal and the further third electromagnetic signal can comprise a (single) arrangement, transmitter transition element (or antenna) or transmitter.

The arrangements for receiving the second electromagnetic signal, the fourth electromagnetic signal, the further second electromagnetic signal and the further fourth electromagnetic signal can comprise a (single) arrangement, receiver transition element (or antenna) or receiver.

According to the disclosed embodiments of the present invention there is provided a well or a container or vessel comprising an apparatus according to an embodiment of the present invention.

The well, container or vessel can be sealed or alternatively not sealed/unsealed.

The well can comprise an oil, gas and/or water well or other effluent.

The well can be configured for production, injection, observation and/or disposal of a feature such as oil, gas and/or water.

It will be appreciated that the embodiments of the present invention hereinbefore described are given by way of example only and are no meant to be limiting of the scope of the invention in any way.

It will be appreciated that embodiments of the present invention may find utility in:
1. production wells;
2. gas and fluid injection wells;
3. monitoring and observation wells;
4. disposal wells;
5. leaching wells; and/or
6. aquifer wells monitoring.
7. bore holes
8. metallic tubulars located on surface, subterranean or subsurface It will be appreciated that embodiments of the present invention utilise the FDR/FMCW real time sensing via an FDR sensor applied inside an overloaded wave-guide.

Embodiments of the present invention may be used in the detection of solids or particulates (e.g. sand) in producing gas wells using a microwave sensor.

The method for detecting solids, or in particular unconsolidated sand grains, can be similar to that hereinbefore described.

A sensor is situated on a wellhead and uses FDR to monitor changes in permittivity and/or attenuation using suitable techniques and algorithms.

The skilled person will appreciate that sand detection is possible using FDR and FMCW technology using the tubulars through which gas is being produced as an over-moded waveguide.

Normally sand production in a high production rate gas well is problematic due to the erosion damage caused to the tubulars and wellhead components. Currently acoustic methods both in-well and externally are deployed for surveillance and analysis. Microwave technology has also been developed but requires a mechanism and deployment system to be placed/run within the production stream.

The method devised by the present Inventors allows a measurement to be made that will utilise FDR and FMCW techniques to detect changes (rate of change) to the dielectric properties of the produced gas stream in real time. As the sand is produced changes to the gas permittivity will occur due to the sand size and volume and will also detect the fluid (water) that may also be present with or attached to the sand particles/grains.

The technique does not require well entry and can be positioned on the wellhead as an integral component of the structure or can be a temporary installation.

It will be understood that the invention can be applied to gas wells and other gas transportation conduits such as pipelines. The sensor is suitable for use on conduit sizes from 25 mm to above 500 mm.

Particulate and/or sand produced from a well can change the permittivity of a well fluid. One can detect a change in permittivity related to water breakthrough which determines a rate of change of permittivity, and therefore, a condition of the well.

The method of the present invention can be used to detect a particulate/sand producing well, e.g. in a group of wells, which may be connected together by a manifold.

It will be understood that embodiments of the present invention utilise a (measured) phase of an electromagnetic signal(s) to determine a variable or characteristic within a (sealed) space (well), e.g. pressure, temperature or permittivity.

It will be appreciated that in embodiments of the present invention one can obtain/determine a liquid level depth. As such, can utilise algorithms to monitor the return time of a microwave (MW) signal propagated into a "waveguide". One can monitor changes, and when changes occur relate such to physical properties within the space/well and the fluids being produced, e.g. changes related to depth and permittivity changes.

One can use algorithms to take account of pressure, temperature and pipe inner diameter (ID) in conjunction with the measured phase changes to the MW signal.

According to the present invention, a scan can be made and (only) the return time of the signal from a feature in the well measured. The "feature" could be static and could be at any depth 0.5 meter to 1000+m meters. A first scan reading according to the invention to the feature could be found to take 5 milliseconds. A second reading according to the present invention taken at a later time (e.g. taken two days later) could show that the scan now took 5.05 milliseconds. All other parameters being equal, a claim can be made that the changes are due to permittivity, though temperature and pressure can affect group velocity, and therefore the measured distance. However, if (high) accuracy is not a problem, then measuring only the time element provides an acceptable result.

It will be appreciated that the implementations mentioned above can be combined. For example, determination of a second parameter related to a second physical distance between the position and a (fixed) calibration feature comprising: transmitting a third electromagnetic signal from a third position to a calibration feature within the space; receiving a fourth electromagnetic signal at a fourth position after reflection of the transmitted third electromagnetic signal from the calibration feature can be cross-checked or sense checked against establishing and/or using or utilising a pipe tally or known number of tubing lengths or tubing joint lengths ("pipe tally") between the position and the calibration feature. The pipe tally may be determined within the well and/or prior to being installed within the well/wellbore.

The invention claimed is:

1. A method for detecting, measuring or determining at least one variable or characteristic in a space, such as a well, container or vessel, the method comprising:
transmitting a first electromagnetic signal from a first position to a feature within the space;
receiving a second electromagnetic signal at a second position after reflection of the transmitted first electromagnetic signal from the feature;
transmitting a third electromagnetic signal from a third position to a calibration feature within the space;
receiving a fourth electromagnetic signal at a fourth position after reflection of the transmitted third electromagnetic signal from the calibration feature;
subsequently transmitting a further first electromagnetic signal from the first position to the feature;
receiving a further second electromagnetic signal at the second position after reflection of the transmitted further first electromagnetic signal from the feature;
transmitting a further third electromagnetic signal from the third position to the calibration feature;

receiving a further fourth electromagnetic signal at the fourth position after reflection of the transmitted further third electromagnetic signal from the calibration feature;

determining the at least one variable or characteristic from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

2. A method for detecting, measuring or determining at least one variable or characteristic in a space, such as a well, container or vessel as claimed in claim 1, wherein:

the first, second, third and/or fourth positions are within the space;

the first electromagnetic signal is transmitted from the first position through at least a portion of the space to the feature;

the second electromagnetic signal is received after propagation of the second electromagnetic signal through at least a portion of the space;

the third electromagnetic signal is transmitted from the third position through at least a portion of the space to the calibration feature;

the fourth electromagnetic signal is received after propagation of the fourth electromagnetic signal through at least a portion of the space;

the further first electromagnetic signal is transmitted from the first position through at least a portion of the space to the feature;

the further second electromagnetic signal is received after propagation of the second electromagnetic signal through at least a portion of the space;

the further third electromagnetic signal is transmitted from the third position through at least a portion of the space to the calibration feature; and the further fourth electromagnetic signal is received after propagation of the fourth electromagnetic signal through at least a portion of the space.

3. A method for detecting, measuring or determining at least one variable or characteristic in a space, such as a well, container or vessel as claimed in claim 1, wherein:

the variable or characteristic is a downhole variable or characteristic;

the feature is a fluid/fluid interface, such as a liquid/gas interface;

the feature is a downhole feature, optionally comprising or including one or more of a fluid, gas, liquid, particulate, sand, colloid, emulsion or suspension; and/ the calibration feature is at a known distance from the first position and the second position; and optionally the calibration feature is a tubing or casing joint, such as a joint in or on a downhole tubular.

4. A method for detecting, measuring or determining at least one variable or characteristic in a space, such as a well, container or vessel as claimed in claim 1, wherein:

the space is unsealed during transmission of the first and third electromagnetic signals and receipt of the second and fourth electromagnetic signals; and/or the space is unsealed or sealed during transmission of the further first and/or further third electromagnetic signals and receipt of the further second and further fourth electromagnetic signals; and the space is sealed after reception of the second and/or fourth electromagnetic signals but before transmission of the further first and/or further third electromagnetic signals.

5. A method for detecting, measuring or determining at least one variable or characteristic in a space, such as a well, container or vessel as claimed in claim 1, wherein:

the third electromagnetic signal comprises or is one and the same as the first electromagnetic signal;

the further third electromagnetic signal comprises or is one and the same as the further first electromagnetic signal;

the fourth electromagnetic signal comprises or is one and the same as the second electromagnetic signal;

the further fourth electromagnetic signal comprises or is one and the same as the further second electromagnetic signal;

the third position comprises or is one and the same as the first position; and the fourth position comprises or is one and the same as the second position.

6. A method for detecting, measuring or determining at least one variable or characteristic in a space, such as a well, container or vessel as claimed in claim 1, wherein:

the at least one variable or characteristic comprises or includes a permittivity or impedance of a material, such as a fluid vapour, within the space/well;

the at least one variable or characteristic comprises or includes a ratio of fluid (F) to gas (G) within the space/well;

the at least one variable or characteristic comprises or includes a pressure (P) of a fluid/gas/liquid/vapour or liquid/gas mixture within the space/well;

the at least one variable or characteristic comprises or includes a temperature (T) of a fluid (F) or Gas (G) within a/the space/well; or the at least one variable or characteristic defines or includes a fluid/gas interface, a fluid/gas ratio, gas permittivity, fluid/fluid contact interface, tubular connections and mechanical internal diameter anomalies and scale depositions such as calcium carbonate as well as other scale or other deposits; and optionally in the method one or more of:

at different times $(t_1, t_2)$ measuring a return time $(T_1, T_2)$ of one or more signals reflected from one or more fixed positions or features within a well, so as to determine a change in return time $(\Delta T)$, and thereby determine one or more variables and/or characteristics;

the variable and/or characteristics vary or change through various phases of the well, such as from completion to production;

the space comprises a bore which is provided within a tubular or an annulus between first and second tubulars; and the first position, second position, third position and/or fourth position is/are located within or on a wellhead device, such as mounted at a head of a well or wellbore, the wellhead device optionally comprising a Christmas tree/Xmas tree/XMT, a Christmas tree cap, a Christmas tree body, a Christmas tree flange, a modified Christmas tree cap, a blind flange, or a mechanical system which provides an attachment/anchor location and/or pressure seal as a temporary or permanent replacement for any of the aforementioned.

7. A method for detecting, measuring or determining at least one variable or characteristic in a space, such as a well, container or vessel as claimed in claim 1, wherein the method comprises:
transmitting an electromagnetic signal from the first position located substantially at or adjacent to surface through a first space to the feature;
receiving an electromagnetic signal at the second position located substantially at or adjacent to surface after reflection of the transmitted electromagnetic signal from the feature and after propagation of the reflected electromagnetic signal through a second/the space.

8. A method for detecting, measuring or determining at least one variable or characteristic in a space, such as a well, container or vessel as claimed in claim 1, wherein:
the well comprises an oil, gas and/or water well;
the well is configured for production, injection, observation or disposal of a fluid such as oil, gas and/or water;
the well is unsealed or sealed; and optionally in the method one or more of:
the method comprises sealing the well before transmitting (the) electromagnetic signal(s), such as the further first, second, third and/or fourth electromagnetic signals; and/or
the method comprises installing completion infrastructure in the well and/or at a head of the well before transmitting the electromagnetic signal(s);
the method comprises installing a valve or valve arrangement at a head of the well (or wellhead) before transmitting the electromagnetic signal(s);
the method comprises installing a Christmas tree at a head of the well before transmitting the electromagnetic signal;
the method comprises pressurising the well before transmitting the electromagnetic signal(s), such as the further first, second, third and/or fourth electromagnetic signals;
the method comprises exposing the well to a fluid pressure existing within a sub-surface formation located adjacent to the well before transmitting the electromagnetic signal(s);
the method comprises producing a fluid from the well before, during and/or after transmitting the electromagnetic signal(s);
the method comprises injecting a fluid into the well before, during and/or after transmitting the electromagnetic signal(s);
the surface defines the mouth, opening or head of the well;
the surface defines the mouth, opening or head of a borehole of the well; and
surface level comprises ground level or a level of the seabed.

9. A method for detecting, measuring or determining at least one variable or characteristic in a space, such as a well, container or vessel as claimed in claim 1, wherein:
the method comprises exciting, launching or otherwise transmitting the electromagnetic signal as a TE mode; or
the method comprises exciting, launching or otherwise transmitting the electromagnetic signal as a TE11 or TE01 mode; and optionally the transmitted electromagnetic signals have a frequency in a frequency range of 1 GHz to 100 GHz, 2 GHz to 50 GHz, 4 GHz to 40 GHz, or 20 GHz to 80 GHz.

10. An apparatus for detecting, measuring or determining at least one variable or characteristic in a space, such as a well, container or vessel, the apparatus comprising:
an integrated transition antenna transceiver or a transition element for transmitting a first electromagnetic signal from a first position to a feature within the space;
an integrated transition antenna transceiver or a transition element for receiving a second electromagnetic signal at a second position after reflection of the transmitted first electromagnetic signal from the feature;
an integrated transition antenna transceiver or a transition element for transmitting a third electromagnetic signal from a third position to a calibration feature within the space;
an integrated transition antenna transceiver or a transition element for receiving a fourth electromagnetic signal at a fourth position after reflection of the transmitted third electromagnetic signal from the calibration feature;
an integrated transition antenna transceiver or a transition element for transmitting a further first electromagnetic signal from the first position to the feature within the space;
an integrated transition antenna transceiver or a transition element for receiving a further second electromagnetic signal at the second position after reflection of the transmitted further first electromagnetic signal from the feature within the space;
an integrated transition antenna transceiver or a transition element for transmitting a further third electromagnetic signal from the third position to the calibration feature;
an integrated transition antenna transceiver or a transition element for receiving a further fourth electromagnetic signal at the fourth position after reflection of the transmitted further third electromagnetic signal from the calibration feature;
a controller for determining the at least one variable or characteristics from a difference or variation in time between the transmission of the first electromagnetic signal and reception of the second electromagnetic signal and the transmission of the further first electromagnetic signal and receipt of the further second electromagnetic signal and a difference or variation in time between the transmission of the third electromagnetic signal and receipt of the fourth electromagnetic signal and the transmission of the further third electromagnetic signal and receipt of the further fourth electromagnetic signal.

11. A well or a container or vessel comprising an apparatus according to claim 10.

12. A well or a container or vessel as claimed in claim 11, wherein the well, container or vessel is sealed or is not sealed/unsealed;
the well comprises an oil, gas and/or water well or other effluent; and
the well is configured for production, injection, observation and/or disposal of a feature such as oil, gas and/or water.

13. A method for detecting, measuring or determining at least one variable or characteristic in a space, such as a well, container or vessel,
the method comprising initially:
determining, from a reflection of a first electromagnetic signal transmitted and received through a waveguide, a first parameter related to a first physical distance between a fixed position and a feature within the space;
determining a second parameter related to a second physical distance between the position and a fixed calibration feature;

the method comprising subsequently:
determining, from a reflection of a further electromagnetic signal transmitted and received through the waveguide, a further first parameter related to a first perceived or detected distance between the position and the feature;
determining a further second parameter related to a second perceived or detected distance between the position and the calibration feature;
the method comprising thereafter:
determining the at least one variable or characteristic from a first difference or variation between the first parameter and the further first parameter and a second difference between the second parameter and the further second parameter, or a first difference or variation between the first physical distance and the first perceived distance and a second difference or variation between the second physical distance and the second perceived distance.

14. A method for detecting, measuring or determining at least one variable or characteristic in a space, such as a well, container or vessel, as claimed in claim 13, wherein:
the first parameter is a time or distance, such as a transmission time of the first electromagnetic signal;
the second parameter is a time or distance, such as a transmission time of a yet further electromagnetic signal or a measurement of pipe length(s) between the position and the calibration feature;
the further first parameter is a time or distance, such as a transmission time of the further electromagnetic signal; and
the further second parameter is a time or distance, such as a transmission time of a still yet electromagnetic signal.

15. A method for detecting, measuring or determining at least one variable or characteristic in a space, such as a well, container or vessel, as claimed in claim 13, wherein:
between the initial step and subsequent steps, the method comprises sealing the space; and
between the initial steps and subsequent steps, the method comprises pressurising the space.

16. An apparatus for detecting, measuring or determining at least one variable or characteristic in a space, such as a well, container or vessel, the apparatus comprising a controller that is configured to:
determine, from a reflection of a first electromagnetic signal transmitted and received through a waveguide, a first parameter related to a first physical distance between a fixed position and a feature within the space;
determine a second parameter related to a second physical distance between the position and a fixed calibration feature;
determine, from a reflection of a further electromagnetic signal transmitted and received through the waveguide, a further first parameter related to a first perceived or detected distance between the position and the feature;
determine a further second parameter related to a second perceived or detected distance between the position and the calibration feature;
determine the at least one variable or characteristic from a first difference or variation between the first parameter and the further first parameter and a second difference or variation between the second parameter and the further second parameter, such as a first difference or variation between the first physical distance and the first perceived distance and a second difference or variation between the second physical distance and the second perceived distance.

17. An apparatus for detecting, measuring or determining at least one variable or characteristic in a space, such as a well, container or vessel as claimed in claim 16, wherein the apparatus comprises a sealing arrangement for sealing the space.

18. An apparatus for detecting, measuring or determining at least one variable or characteristic in a space, such as a well, container or vessel as claimed in claim 16, wherein the apparatus comprises a pressurising arrangement for pressurising the space.

19. A well or a container or vessel comprising an apparatus according to claim 16.

20. A well or a container or vessel as claimed in claim 19, wherein:
the well, container or vessel is sealed or not sealed/unsealed; and
the well comprises an oil, gas and/or water well; and optionally the well is configured for production, injection, observation or disposal of a feature such as oil, gas and/or water.

* * * * *

UNITED STATES PATENT AND TRADEMARK OFFICE
CERTIFICATE OF CORRECTION

PATENT NO. : 12,235,404 B2
APPLICATION NO. : 17/642181
DATED : February 25, 2025
INVENTOR(S) : Sydney Joseph Littleford It is certified that error appears in the above-identified patent and that said Letters Patent is hereby corrected as shown below:

In the Specification

Column 10, Line 65: Please correct "withing" to read --within--

Column 16, Line 8: Please insert a paragraph break between "unsealed." and "The well,"

Column 18, Line 46: Please insert a paragraph break between "feature." and "In a second"

Column 20, Line 38: Please correct "tubulars." to read --tubulars;--

Column 21, Line 1: Please correct "oi," to read --oil,--

Column 29, Line 23: Please correct "medium,c" to read --medium, c--

Column 30, Lines 46-47: Please correct "6.694 pS." to read --6.694μS.--

Column 35, Lines 31-32: Please correct "(10 MHZ)" to read --(≥10 MHZ)--

Column 35, Line 47: Please correct "Pressure)." to read --Pressure.--

Column 35, Line 48: Please correct "Water-Cut Measurement" to read --Water-Cut Measurement.--

In the Claims

Column 45, Line 61, Claim 9: Please insert a paragraph break between "optionally" and "the transmitted"

Signed and Sealed this
Twenty-seventh Day of May, 2025

Coke Morgan Stewart
*Acting Director of the United States Patent and Trademark Office*